United States Patent [19]

Koshikawa et al.

[11] Patent Number: 5,717,630
[45] Date of Patent: Feb. 10, 1998

[54] MAGNETIC MEMORY DEVICE

[75] Inventors: Takao Koshikawa; Yukinori Ikegawa; Hiroshi Maeda; Yoshinori Ohtsuka; Takahiro Imamura; Yoshifumi Mizoshita, all of Kawasaki, Japan

[73] Assignee: Fujitsu Limited, Kawasaki, Japan

[21] Appl. No.: 630,993

[22] Filed: Apr. 12, 1996

Related U.S. Application Data

[63] Continuation of Ser. No. 297,178, Aug. 29, 1994.

[30] Foreign Application Priority Data

| Sep. 20, 1993 | [JP] | Japan | 5-233732 |
| Mar. 17, 1994 | [JP] | Japan | 6-046694 |

[51] Int. Cl.$^6$ .............. G11B 5/33; G11B 5/37; G11B 5/39
[52] U.S. Cl. .............. 365/151; 369/13; 369/101; 369/126; 360/106
[58] Field of Search .............. 365/151; 369/44.11, 369/117, 101, 120, 126, 13

[56] References Cited

U.S. PATENT DOCUMENTS

| 4,315,291 | 2/1982 | Lazzari . |
| 4,775,908 | 10/1988 | Yeas .............. 360/106 |
| 5,155,715 | 10/1992 | Ueyema et al. .............. 369/44.11 |
| 5,212,680 | 5/1993 | Toupin . |
| 5,323,375 | 6/1994 | Ihara et al. .............. 369/126 |

FOREIGN PATENT DOCUMENTS

| 3717552 | 12/1988 | Denmark . |
| 0551814 | 7/1993 | European Pat. Off. . |
| 63-96756 | 4/1988 | Japan . |
| 2092807 | 8/1982 | United Kingdom . |

OTHER PUBLICATIONS

IBM Technical Disclosure Bulletin, vol. 32, No. 8A, Jan. 1990, Armonk, NY pp. 362–363.
Patent Abstracts of Japan, vol. 15, No. 245 (P-1218), Jun. 24, 1991 JP-A-03 076015 (TDK Corp) Apr. 2, 1991.
IBM Technical Disclosure Bulletin, vol. 31, No. 5, Oct. 1988, Armonk, NY pp. 378–381.
IBM Technical Disclosure Bulletin, vol. 34, No. 7B, Dec. 1991, Armonk, NY pp. 365–367.
IBM Technical Disclosure Bulletin, vol. 34, No. 3, Aug. 1991, Armonk, NY pp. 124–125.
IEE Translation Journal on Magnetics In Japan, vol. 8, No. 4, Apr. 1993 New York, pp. 245–254, T. Ohkubo et al.
Patent Abstracts of Japan, vol. 4, No. 18 (E-171), Feb. 13, 1980 & JP-A-54 157613 (Fujitsu K. K.) Dec. 12, 1979.
Patent Abstracts of Japan, vol. 2, No. 45 (E-24), Mar. 27, 1978 & JP-A-53 009110 (Fujitsu Ltd.) Jan. 27, 1978.
Patent Abstracts of Japan, vol. 7, No. 6 (P-167) [1151], Jan. 11, 1983 & JP-A-57 164416 (Fujitsu K. K.) Oct. 9, 1982.
Patent Abstracts of Japan, vol. 7, No. 206 (P-222) [1351], Sep. 10, 1983 & JP-A-58 102323 (Suwa Seikosha K. K.) Jun. 17, 1983.
IBM Technical Disclosure Bulletin, vol. 20, No. 8, Jan. 1978, Armonk, NY pp. 3052, G. F. Pennel et al.

(List continued on next page.)

*Primary Examiner*—Viet Q. Nguyen
*Attorney, Agent, or Firm*—Nikaido, Marmelstein, Murray & Oram LLP

[57] ABSTRACT

A magnetic memory device comprises: a vertically magnetic recording medium; a probe formed of an electrically conductive as well as soft-magnetic material, a pointed end of the probe faces the magnetically recording medium across a gap; a magnetic flux detecting element for detecting a magnetic flux caught by the probe, where the magnetic flux is from a data recorded on the magnetically recording medium; a vertical controller for keeping the gap constant by the use of a tunnel current flowing via said gap into the probe while a voltage is applied across the gap; and a scan mechanism for scanning the probe along the magnetically recording medium. The magnetic memory device may further comprises an exciting coil for magnetizing the probe so as to write a data in the magnetically recording medium. The probe may be recessed from the scanning position when the probe is not in operation.

33 Claims, 19 Drawing Sheets

OTHER PUBLICATIONS

IBM Technical Disclosure Bulletin, vol. 26, No. 7A, Dec. 1983, Armonk, NY pp. 3127–3128, D. L. Beam et al.

IBM Technical Disclosure Bulletin, vol. 18, No. 6, Nov. 1975 Armonk, NY pp. 1750–1751, G. Bate et al.

Patent Abstracts of Japan, vol. 13, No. 125 (P–847) [3473], Mar. 28, 1989 & JP–A–63 293714 (NEC Kansai Ltd.) Nov. 30, 1988.

Patent Abstracts of Japan, vol. 10, No. 212 (P–480) [2268], Jul. 24, 1986 & JP–A–61 051616 (Hitachi Ltd.) Mar. 14, 1986.

Patent Abstracts of Japan, vol. 6, No. 121 (P–126) [999], Jul. 6, 1982 & JP–A–57 046310 (Suwa Seikosho K. K.) Mar. 16, 1982.

Patent Abstracts of Japan, vol. 4, No. 115 (P–23) [597], Aug. 16, 1980 & JP–A–55 070934 (Fujitsu K. K.) May 28, 1980.

Patent Abstracts of Japan, vol. 7, No. 138 (P–204) [1283], Jun. 16, 1983 & JP–A–58 053016 (Ricoh K. K.) Mar. 29, 1983.

Patent Abstracts of Japan, vol. 12, No. 144 (P–697), May 6, 1988 & JP–A–62–264420 (Ricoh Co. Ltd.) Nov. 17, 1987.

Patent Abstracts of Japan, vol. 6, No. 233 (P–156) [1111], Nov. 19, 1982 & JP–A–57 133512 (Ricoh K. K.) Aug. 18, 1982.

Proceedings IEE Micro Electro Mechanical Systems, 1992 Traevemuende, DE, pp. 214–219, D. Kobayashi et al.

"Submicron Magnetizing and Its Detection Based on the Point Magnetic Recording Concept", Ohkubo et al, IEEE Transactions on Magnetics, vol. 27, No. 6, Nov. 1991, pp. 5286–5288.

"Small Magnetic Patterns Written with a Scanning Tunneling Microscope", Watanuki et al, IEEE Transactions on Magnetics, vol. 27, No. 6, Nov. 1991, pp. 5289–5291.

"High–Resolution, Tunneling–Stabilized Magnetic Imaging and Recording", Moreland et al, Appl. Phys. Letter, vol. 57, No. 3, Jul. 16, 1990, pp. 310–312.

Fig.5A
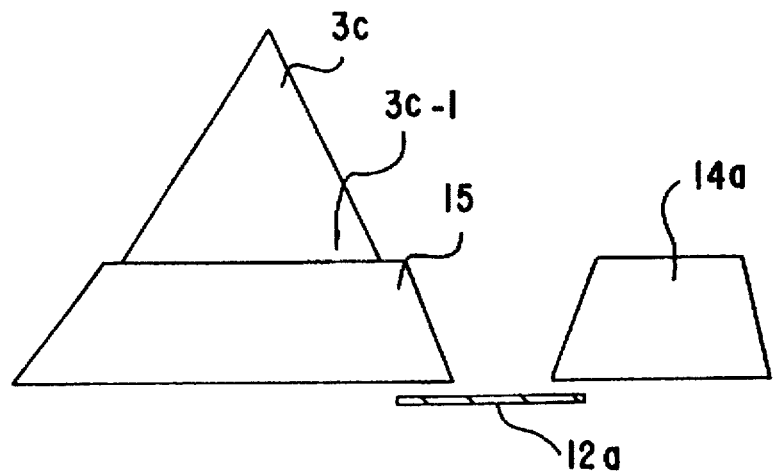
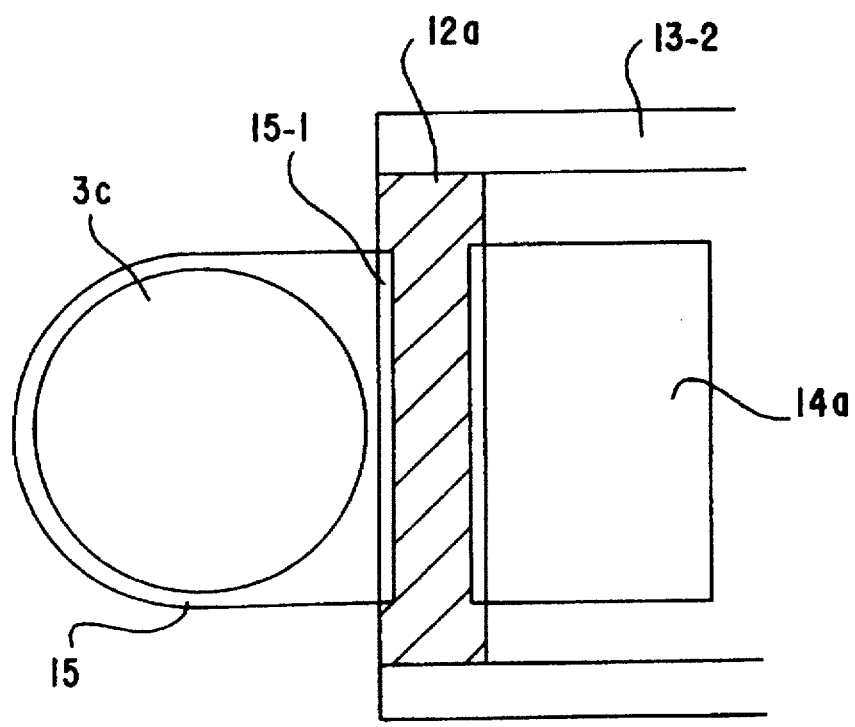
Fig.5B

Fig.7A
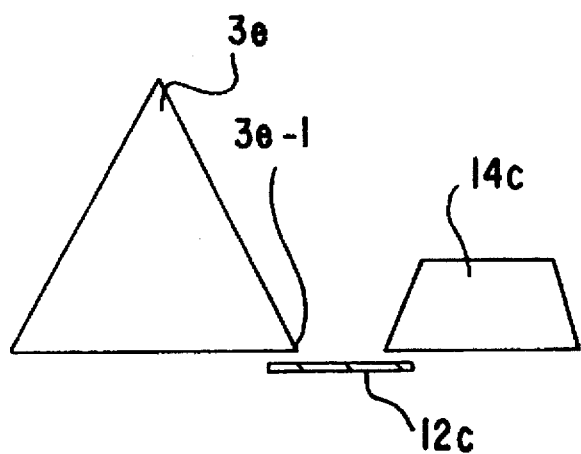
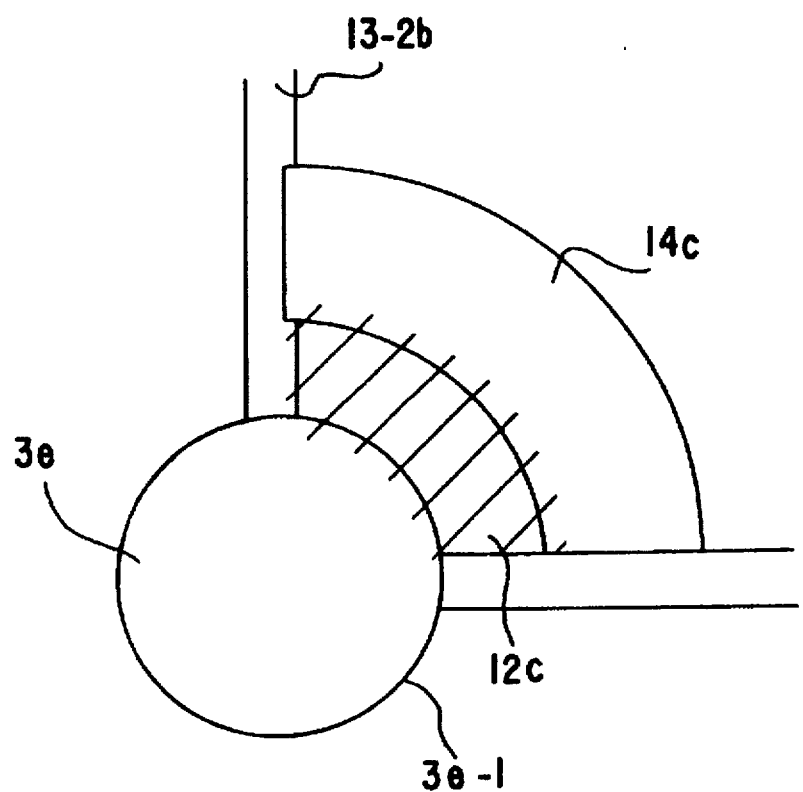
Fig.7B

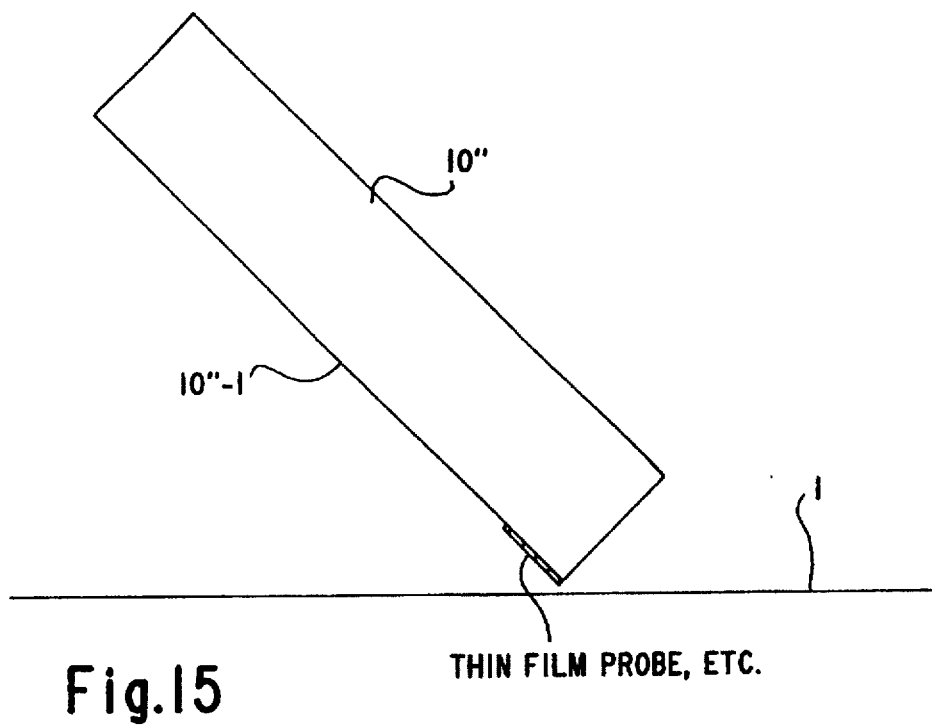
Fig.15  THIN FILM PROBE, ETC.
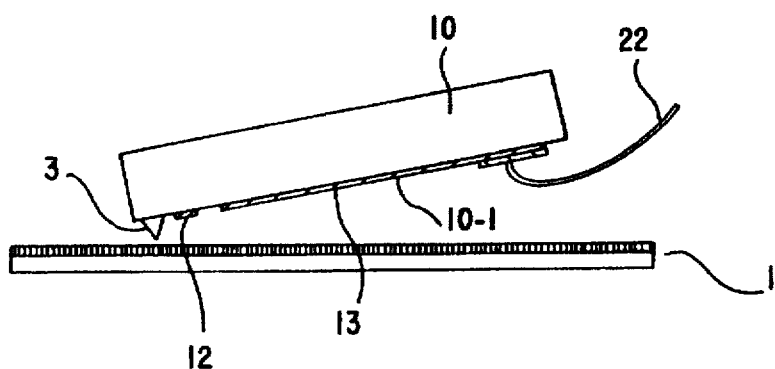
Fig.16

MAGNETIC MEMORY DEVICE

This application is a continuation of application Ser. No. 08/297,178 filed Aug. 29, 1994.

BACKGROUND OF THE INVENTION

1. Field of the invention

This invention relates to a magnetic memory device where the scanning of magnetic memory medium surface is performed in no contact with the surface, by the use of scanning tunneling microscope technique.

2. Description of the Related Arts

Techniques employing a scanning probe microscope, referred to hereinafter as SPM, have been rapidly developing recently. Accordingly, its applications to magnetic recording device have been widely attempted. Magnetic force microscope, referred to hereinafter as MFM, has achieved several nano meter resolution, as reported on Journal of the Magnetics Society of Japan (vol.16, No.3, 1992 p532-540) by Ookubo, et al., or disclosed on Japanese Provisional Patent Publication HEI 05-073850, by Mizoshita et al.

The method disclosed there is constituted as follows. Recording of data into a magnetic domain is performed by applying an electric current into an exciting coil while the top of a sharp magnetic probe is kept in contact with a surface of the recording medium. Reading of thus vertical recorded data from the magnetic domain is performed by detecting a change, caused from the magnetic field of the vertical magnetization bit domain, in an envelope of the amplitude of a signal picked up with the MFM probe by scanning this MFM probe while the MFM probe is vibrated. This detection method is an application of a non-contact Atomic Force Microscope, which is a kind of the above-mentioned technology, to the detection of the magnetic force, i.e. the gradient.

In the detection methods of the above-explained prior arts employing the MFM, influence of roughness of the surface of the recording medium is undesirably detected as a change in a magnetic force, consequently, is mixed as a noise in the detected signal. Therefore, it has been difficult to separate the reproduced information properly from the noise.

SUMMARY OF THE INVENTION

It is a general object of the invention to provide an extremely high density magnetic memory device which is free from the influence of mechanical roughness of the medium surface, that is, capable of reading-out with few noises, where the scanning of the medium surface is performed in no contact with the medium surface in a way similar to the scanning tunneling microscope technique.

A magnetic memory device according to the present invention comprises: a perpendicular magnetic recording medium (1); a probe (3) formed of an electrically conductive as well as soft-magnetic material, a top of the probe faces the magnetically recording medium across a gap (2); a magnetic flux detecting element (12) for detecting a magnetic flux caught by the probe, where the magnetic flux is from a data recorded on the magnetically recording medium; a vertical controller (4) for keeping the gap constant by the use of a tunnel current flowing via said gap into the probe while a voltage is applied across the gap; and a scan mechanism (6) for scanning the probe along the magnetically recording medium. The magnetic memory device may further comprises an exciting coil (7-1, 17a, 17b) for magnetizing the probe so as to write a data in the magnetically recording medium.

The above-mentioned features and advantages of the present invention, together with other objects and advantages, which will become apparent, will be more fully described hereinafter, with references being made to the accompanying drawings which form a part hereof, wherein like numerals refer to like parts throughout.

A BRIEF DESCRIPTION OF THE DRAWINGS

FIG. 1 schematically illustrates a general block diagram of the present invention;

FIG. 2 schematically illustrates a first preferred embodiment where a return yoke is not installed yet;

FIGS. 3A and 3B schematically illustrates the first preferred embodiment after the return yoke is installed;

FIG. 4 schematically illustrates a slanted view of the second preferred embodiment;

FIGS. 5A and 5B schematically illustrate a side view and a plane view of the third preferred embodiment;

FIGS. 6A and 6B schematically illustrate a side view and a plane view of the fourth preferred embodiment;

FIGS. 7A and 7B schematically illustrate a side view and a plane view of the fifth preferred embodiment;

FIGS. 8A and 8B schematically illustrate a side view and a plane view of the sixth preferred embodiment;

FIG. 9 schematically illustrates a plane view of the seventh preferred embodiment;

FIG. 10 schematically illustrates a plane view of the eighth preferred embodiment;

FIGS. 11A and 11B schematically illustrate a side view and a plane view of the ninth preferred embodiment;

FIG. 12 schematically illustrates a slanted view of the tenth preferred embodiment;

FIG. 13 schematically illustrates a slanted view of the eleventh preferred embodiment;

FIGS. 14A and 14B schematically illustrate a side view and a plane view of the eleventh preferred embodiment;

FIG. 15 schematically illustrates a side view of the twelfth preferred embodiment;

FIG. 16 schematically illustrates a side view of the thirteenth preferred embodiment;

FIG. 17 schematically illustrates a slanted view of the fourteenth preferred embodiment;

FIG. 18 schematically illustrates a slanted view of the fifteenth preferred embodiment;

FIG. 19 schematically illustrates a slanted view of the sixteenth preferred embodiment;

FIG. 20 schematically illustrates a general block diagram of the seventeenth and eighteenth preferred embodiments;

FIG. 21 schematically illustrates a cross-sectional view of the seventeenth preferred embodiment;

FIG. 22 schematically illustrates a slanted view of the seventeenth preferred embodiment;

FIG. 23 schematically illustrates a principle cross-sectional plane view of a saw teeth actuator;

FIGS. 24A and 24B schematically illustrate the operations of the saw teeth actuator;

FIG. 25 schematically illustrates a plane view of the eighteenth preferred embodiment; and FIGS. 26A and 26B schematically illustrate the operations of the eighteenth preferred embodiment;

DESCRIPTION OF THE PREFERRED EMBODIMENT

Figure 1:
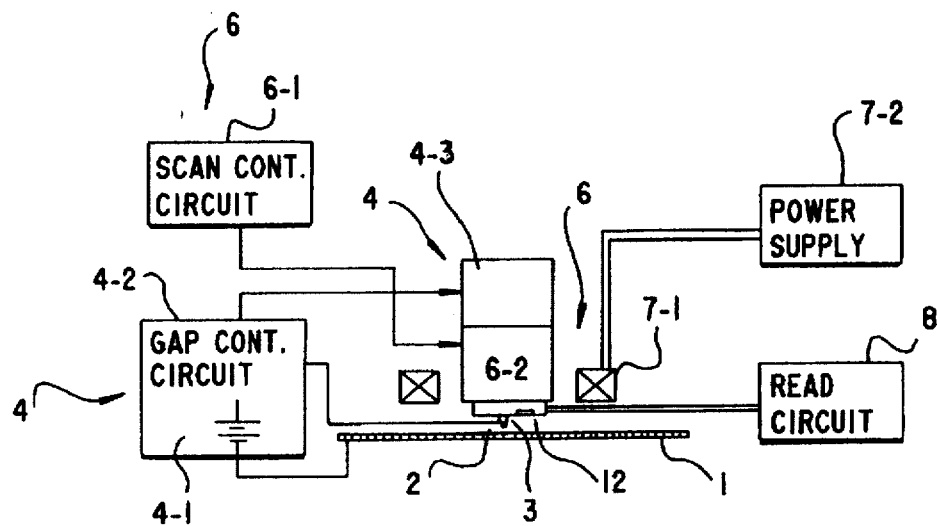

With reference to figures, preferred embodiments of the present invention are hereinafter explained in detail. FIG. 1 is a general block diagram of an apparatus which magnetically records as well as reproduces a digital data according to the present invention. The numeral 1 denotes a vertical magnetic recording medium, which has been widely employed, and is formed with a recording layer 1-1 which is typically formed of vertically anisotropic Co-Cr of 200 nm in thickness and a underlayer 1-2 formed of soft magnetic Ni-Fe of 500 nm in thickness.

The horizontal position of a probe 3 with respect to magnetic recording medium 1 is coarsely adjusted by an electrostatic actuator which preferably utilizes a repulsion/attraction force of an electrostatic force. This coarse adjustment mechanism is not shown in this figure, however, can be composed of the structure disclosed, for instance, in Japanese Provisional Patent Publication HEI 05-073850.

Probe 3 moves to a target data bit by the horizontal movement of recording medium 1 or of probe 3 by means of this coarse adjustment mechanism. Constitution and operation of the magnetic head of the present invention at the horizontal position to which probe 3 has been thus coarsely adjusted and fixed are hereinafter explained.

Top of probe 3, which will be described later in detail, is opposite to the surface of magnetic recording medium 1 across a predetermined first gap 2, for instance, several angstroms by means of a vertical controller 4. Vertical controller 4 comprises a gap driving mechanism 4-3 and a gap control circuit 4-2. A predetermined voltage, for instance, 2V is applied across first gap 2 from a power supply 4-1 included in gap control circuit 4-2. Gap control circuit 4-2 detects a tunnel current, for instance, about 2 nA flowing across the gap generated by the applied voltage, in order to keep the gap constant by controlling vertical position of gap driving mechanism 4-3 by keeping the tunnel current constant. As an alternative in order to detect the gap space, the voltage across the first gap may be detected while a constant tunnel current is kept flowing across the gap. Gap driving mechanism 4-3 is usually comprises a piezo element, and carries a scan driving mechanism 6-2.

A scan mechanism 6 comprising scan driving mechanism 6-2 formed of a piezo element is controlled by scan control circuit 6-1, so as to mechanically scan the magnetic head, that is, the above-mentioned probe and its peripheral parts, such as yokes, in a direction parallel to the surface of magnetic recording medium 1, while first gap 2 between the probe top and the magnetic recording medium is kept constant. Details of the scan mechanism are explained later with reference to the figures.

The probe can shift to an adjacent track having the same scan direction by means of a shift mechanism which also employs a piezo element. This shift mechanism is not shown in the figures.

Driving technique by means of the STM has been widely known as reported, for instance, on Japanese Journal of Applied Physics, Vol.16, No. 3, 1992, p.504 and so on.

Probe 3 is provided coaxially with an exciting coil 7-1. In a write-operation, an exciting current is applied from a power supply 7-2 to exciting coil 7-1. In a read-operation, a read circuit 8 detects a change in the magnetic flux picked up by the probe by the change in the electrical resistance value of a magnetic flux detection element, for example, formed of a magneto-resistive effect element 12, referred to hereinafter as an MR element.

Figure 2:
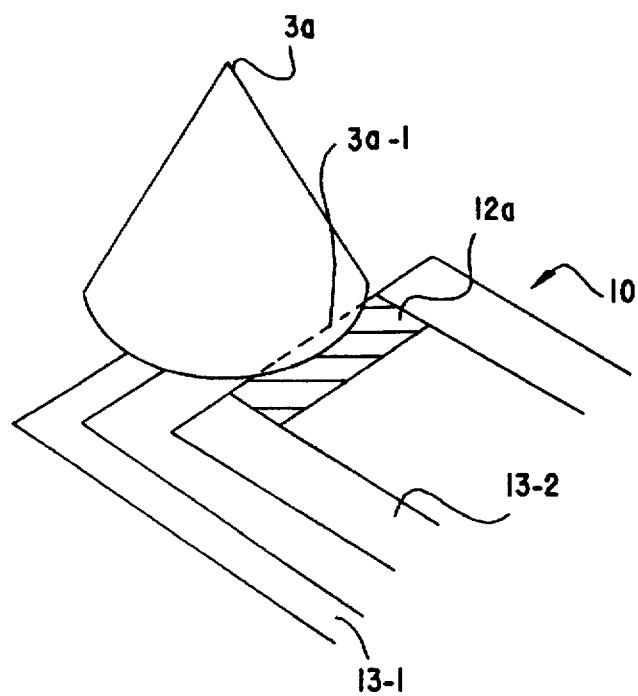
Figure 3A:
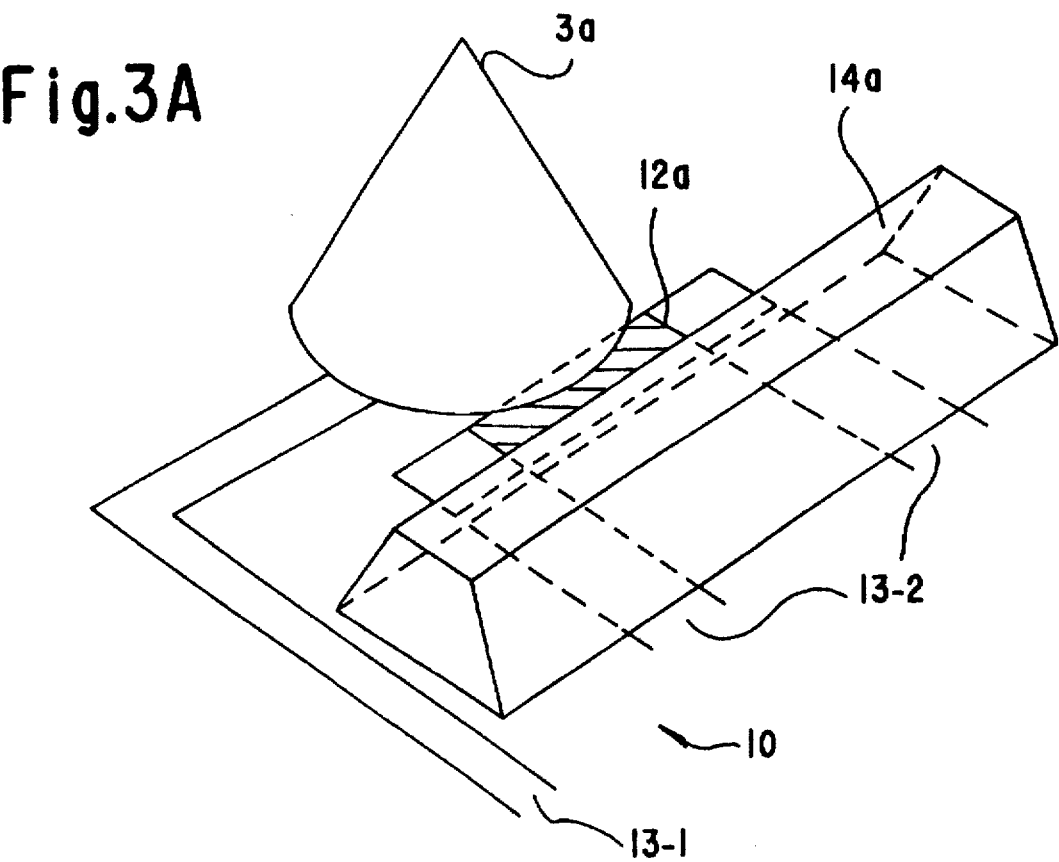
Figure 3B:
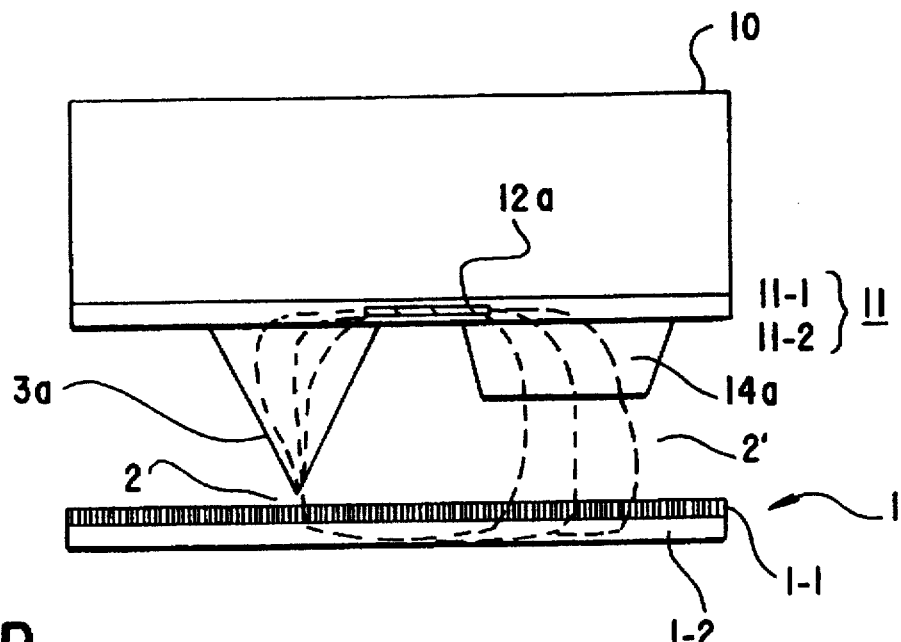

As a first preferred embodiment of the present invention hereinafter is explained a magnetic head comprising a probe 3a, a magnetic flux detection element 12a and a return yoke 14a, with reference to FIG. 2 and FIG. 3. FIG. 2 shows a perspective view of the head before having the return yoke installed therein yet. FIG. 3A and B show a perspective view and a side view, respectively, having the return yoke already installed. Upon a flat supporting substrate 10 of silicon is formed an insulation layer 11-1, for instance, of a 0.05 μm to 0.1 μm thick alumina layer. Thereupon is formed an MR element 12a of, for example nickel-iron alloy of about 200 angstrom in thickness, about 4 μm in width and about 20 μm in length, by means of sputtering or evaporation, etc. by the use of a photo resist.

To both the longitudinal ends of MR element 12a are connected lead-conductors 13-2 formed with a deposition of gold, copper or aluminum. All over these patterns is formed a second insulation layer 11-2, for instance, of an alumina film of 0.05 μm to 0.1 μm in thickness. Borderline between first and second insulation layers 11-1 and 11-2 is not drawn in FIG. 3B. These two insulation layers together are denoted with the numeral 11. Insulation layer 11 is not drawn in FIG. 2, FIG. 3A, FIGS. 4 to 13, FIGS. 15 to 19, FIG. 22, FIGS. 25 and 26.

Upon insulation layer 11-2 is formed a pattern of a return yoke 14a in parallel with and above the other long side of MR element 12a, with, for example, nickel-iron of 1 to 2 μm in thickness and wider than MR element 12a in area, for example, of 3 to 10 μm in width and about 50 μm in length so as to magnetically couple with a long side of MR element 12a. Further upon insulation layer 11-2 is formed a pattern of a conductor 13-1 of copper or aluminum about 0.1 μm in thickness and about 30 μm width by the use of photoresist and deposition so as to lead out the tunnel current. Moreover, upon insulation layer 11-2 is formed a cone probe 3a according to the below-described method so as to electrically contact lead-our conductor 13-1 as well as magnetically couple to MR element 12a by locating a side 3a-1 of the base of probe cone 3a over a long side of MR element 12a.

Probe 3a is in a shape of a cone formed with a material which is soft-magnetic as well as electrically conductive, for instance, a nickel-iron alloy, having a diameter of about 20 μm at the bottom and height of 10 μm to 30 μm. The cone can be made by forming a cylinder in a hole provided in a resist pattern by means of plating; then the cone's top end is sharpened by means of an ion-milling. The cone recited herein has not always necessarily to be strictly a cone as long as the top is in a needle shape. Accordingly, a pyramid shape is acceptable as described later in further preferred embodiments.

Moreover, though the probe was described as of a nickel-iron alloy, the core part of the cone may be formed of other non-magnetic material, for instance, aluminum or an insulator, such as alumina, as long as the top and the surface of the probe are soft-magnetic.

The probe and the return yoke are arranged so as to face magnetic recording medium 1. Accordingly, a closed magnetic circuit is formed via probe 3a, MR element 12a, return yoke 14a, a second gap 2' between return yoke 14a and magnetically recording medium 1, underlayer 1-2, and first gap 2 between recording layer 1-1 and probe 3a. Flow of the magnetic flux is shown with a dotted line in FIG. 3B.

Probe 3 scans the surface of magnetic recording medium 1 by means of the above-mentioned scan driving mechanism 6-2 while keeping first gap 2 constant by means of above-mentioned vertical controller 4. Then, a direction of the magnetic flux in the above-mentioned closed magnetic circuit changes depending on the direction of the magnetic field recorded in recording medium's domain to which the probe top is facing. Read circuit 8 connected to the lead-out conductor 13-2 of MR element 12a detects a change in the resistance value by detecting a change in the current or in the voltage across the MR element gap while applying a constant voltage or a constant current to the MR element.

In operating the MR element, the direction of the magnetization in MR element is biased by approximately 45 degree with respect to the current direction, as widely known, in order to improve the linearity of the output waveform detected therefrom. For this purpose, there have been widely employed such methods that a SAL (Soft Adjacent Layer) bias is laid over the MR element, or conducting layers are laid on the MR element so that the magnetic field of the current flowing in the conducting layer provides the bias properly. Figures and explanation of the biasing methods are omitted in FIGS. 2 and 3, but will be explained later as its typical example in the seventh preferred embodiment.

In writing a magnetic data, an exciting current is applied from a power source 7-2 to the exciting coil 7-1 in a direction in accordance with the data to be written, while the top of the probe is facing to a magnetization bit to which the data is to be written.

Figure 4:
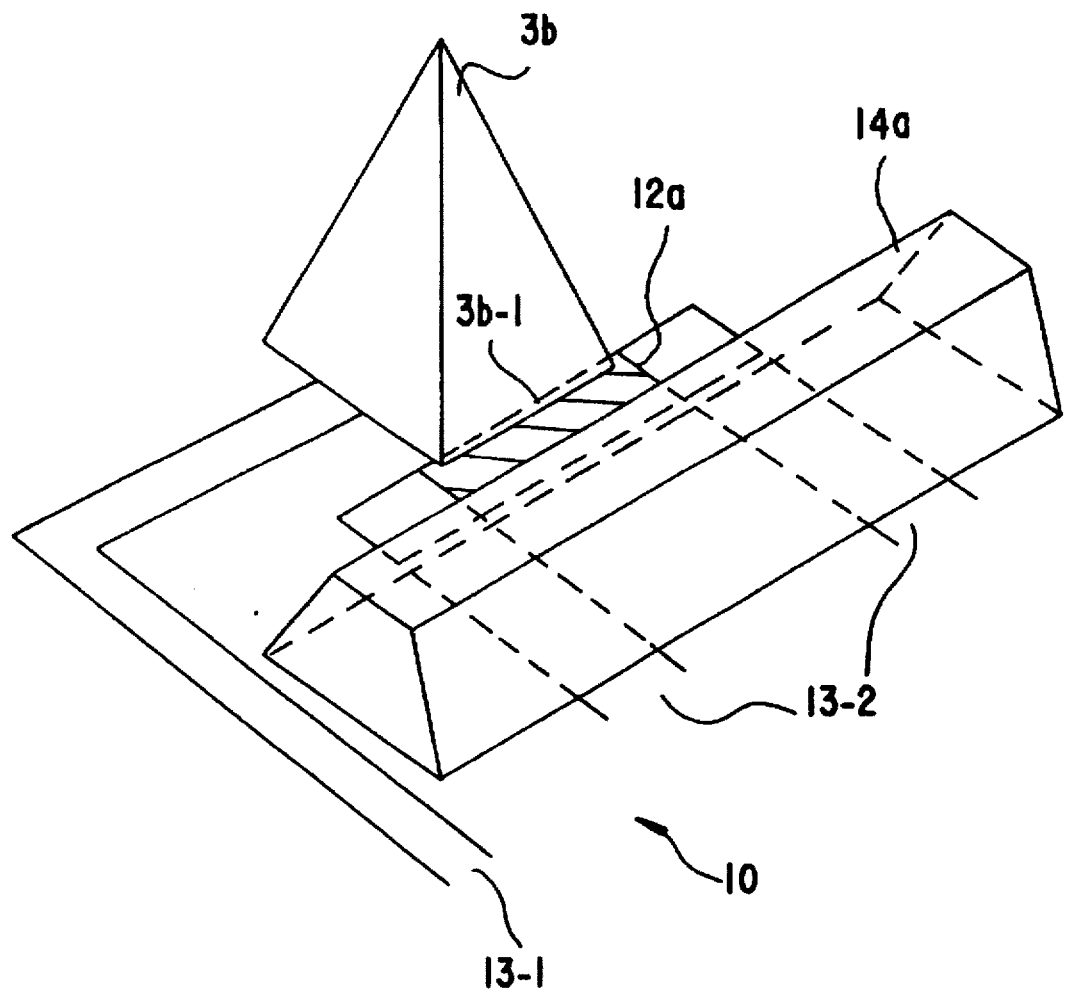

A second preferred embodiment of the present invention is hereinafter explained with reference to FIG. 4. In this preferred embodiment, in place of cone 3a is employed a pyramid 3b, a straight side of whose base is magnetically coupled with MR element 12a. This configuration is excellent in that the distribution as well as the angle of the magnetic flux flowing from the probe to MR element 12a can be uniform, as well as in that the amount of the overlap of the base onto the MR element can be controlled certainly and easily.

A third preferred embodiment of the present invention is hereinafter explained with reference to FIG. 5. In this preferred embodiment there is additionally provided a supplementary yoke 15 of a soft magnetic material, for instance, nickel-iron, beneath the base of probe 3a of the first preferred embodiment, so as to extend the probe base to a long side of MR element 12a. Diameter of the portion of supplementary yoke 15 beneath probe 3c may be the same as or a little larger than the base of the probe, and the thickness may be the same as return yoke 14a. This configuration is excellent similarly to the second preferred embodiment in that the distribution as well as the angle of the magnetic flux flowing from probe 3c to MR element 12a can be arranged uniform.

Figure 6A:
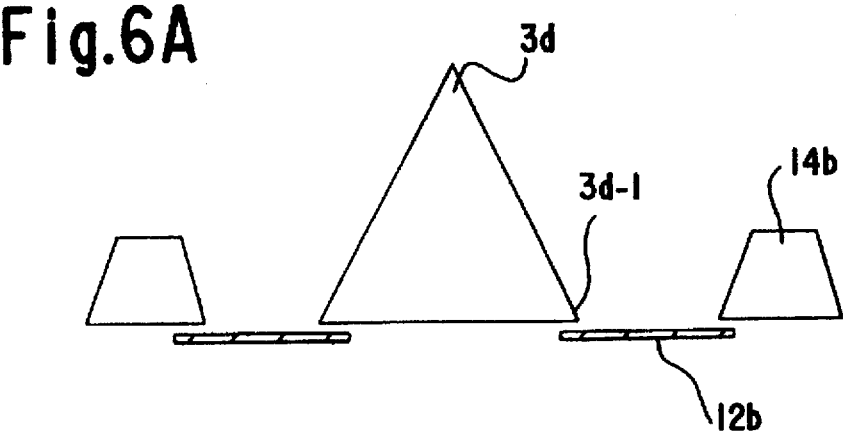
Figure 6B:
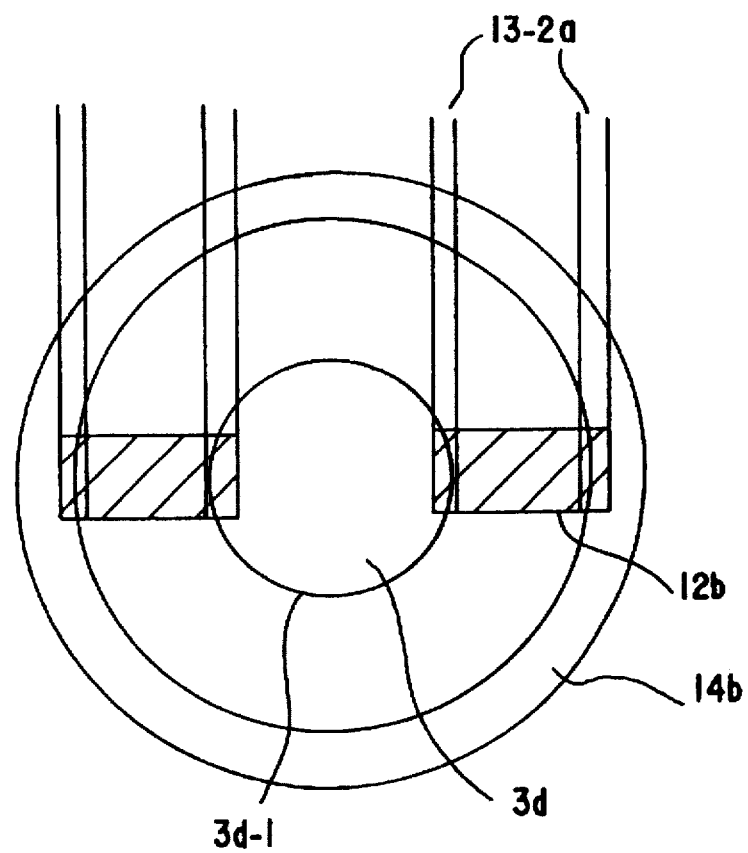

A fourth preferred embodiment of the present invention is hereinafter explained with reference to FIG. 6. In this preferred embodiment, there is provided a return yoke 14b, for instance, of nickel-iron in a shape of a ring coaxial with the base of cone-shaped probe 3d. Two of MR elements 12b are provided radially and symmetrically from the base of probe 3d, while electrically insulated from but magnetically coupled with probe 3d. The other end of each MR element 12b is magnetically coupled with return yoke 14b, but is electrically insulated therefrom. From both the ends of MR element 12b are connected lead-out conductors 13-2a, respectively. Though there is not shown the lead-out conductor of probe 3d, the places where the lead-out conductors intersects with ring return yoke 14b or the place where lead-out conductors 13-2a of MR element 12b intersects with return yoke 14b is insulated from the return yoke by insulation layer 11, which are not shown in FIG. 6. This configuration is excellent in that the magnetic resistance of the above-mentioned closed-magnetic circuit can be decreased owing to the big return yoke, as well as in that the demagnetization of the MR element can be decreased by the magnetic flux flowing from the probe along longitudinal direction of the MR element.

A fifth preferred embodiment of the present invention is hereinafter explained with reference to FIG. 7. In this preferred embodiment, there is provided a return yoke 14c, for instance, of nickel-iron, in a shape of a circular arc coaxial with the base of probe 3e only for a quarter of its central angle, that is, 90 degrees. An MR elements 12c in a shape of a circular arc magnetically couples return yoke 14c and circumferences of the base of probe 3e. Lead-out conductors 13-2b are connected to both the ends of circular arc of MR element. This configuration is excellent in that the magnetic flux radially leaking out of the probe can be efficiently detected.

Figure 8A:
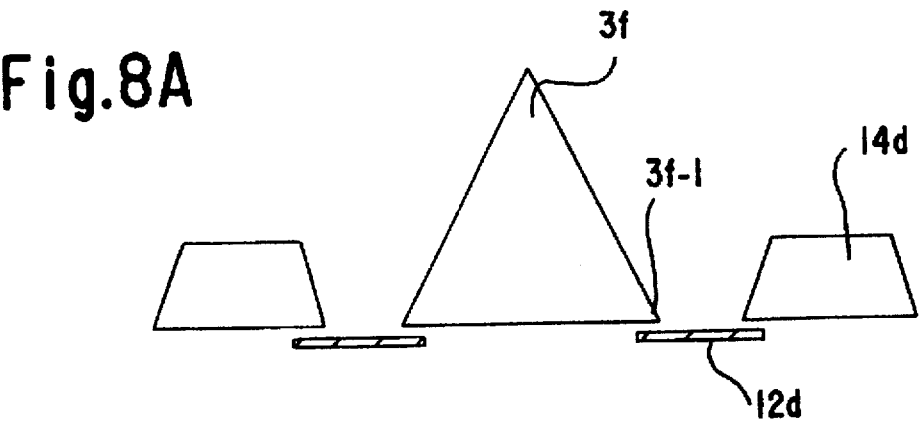
Figure 8B:
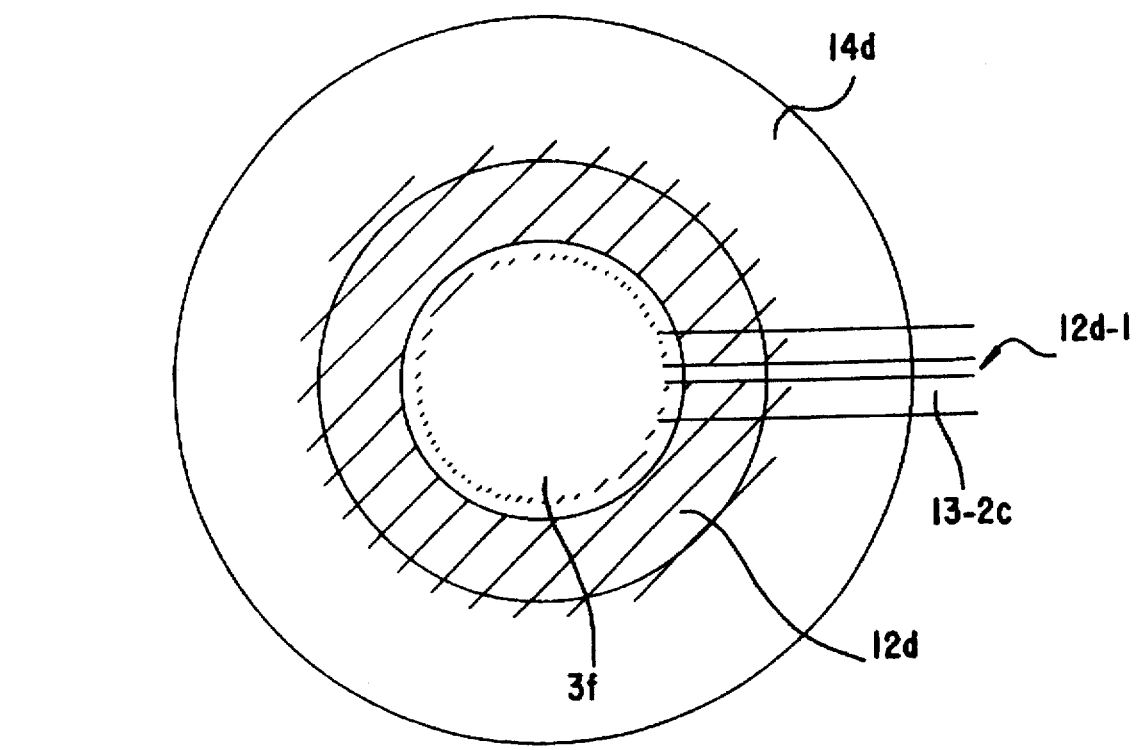

A sixth preferred embodiment of the present invention is hereinafter explained with reference to FIG. 8. In this preferred embodiment, there is provided a return yoke 14d in a ring shape coaxial with the base of probe 3f in a needle shape. Return yoke 14d is formed of nickel-iron of 2 μm in thickness and 10 μm in width, for instance. The ring-shaped MR elements 12d magnetically couples return yoke 14d with circumference of the base of probe 3f. MR element 12d is formed of nickel-iron of 0.02 μm in thickness and 4 μm in width, for instance. The ring of MR element 12d is cut along a line 12d-1 extending radially from the center of the probe. Lead-out conductors 13-2c are connected to thus cut ends of MR element 12d while being insulated from return yoke 14d. In this configuration, most of the magnetic flux flowing into the probe can be efficiently taken out of its base into the MR element. Moreover, because the return yoke is large as well as arranged entirely around circumference of the probe, magnetic resistance of the closed magnetic circuit can be decreased. However, in this coaxial configuration it is difficult to incline the angle of the sense current by about 45 degrees with respect to the magnetization of the MR element as mentioned above.

Figure 9:
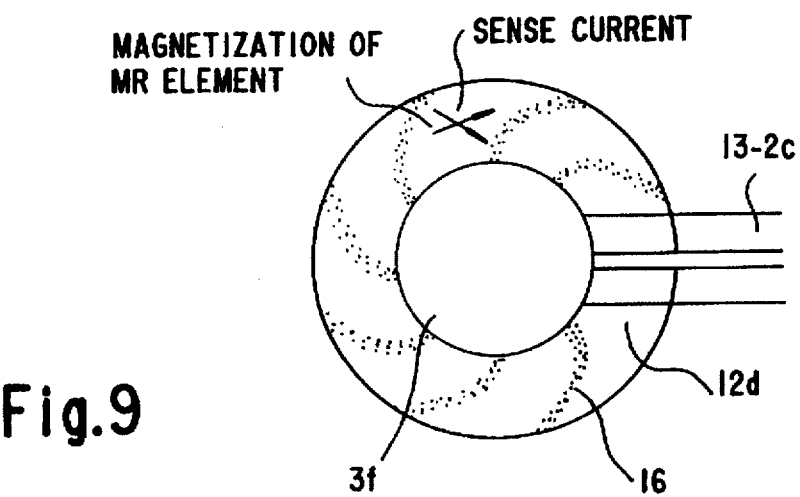

A seventh preferred embodiment of the present invention is hereinafter explained with reference to FIG. 9. In this preferred embodiment, a plurality of electrically conductive electrodes 16 formed with deposition of gold, for instance, are inclined from radial lines of the circle of the probe base, in contact with upper or lower surface of MR element 12 of FIG. 8. This is a widely-known technique called Bar Bar Pole. Once each electrode 16 collects the sense current flowing along the circular arc of MR element 12d, the current is directed to flow along the shortest path towards the adjacent electrode. Directions of the sense current flowing between two adjacent electrodes 16 are indicated with one of arrows. An appropriate arrangement of the shape and location of electrodes 16 allows the direction of the sense current to be inclined substantially 45 degrees with respect to the magnetic flux as indicated with another arrow. As a result, an excellently linear bias can be accomplished.

Moreover, the MR element and the return yoke formed in the ring shape as mentioned above can be utilized as a magnetic coil in the writing operation, where a current is applied into the MR element or the return yoke, as is hereinafter described in detail.

Figure 10:
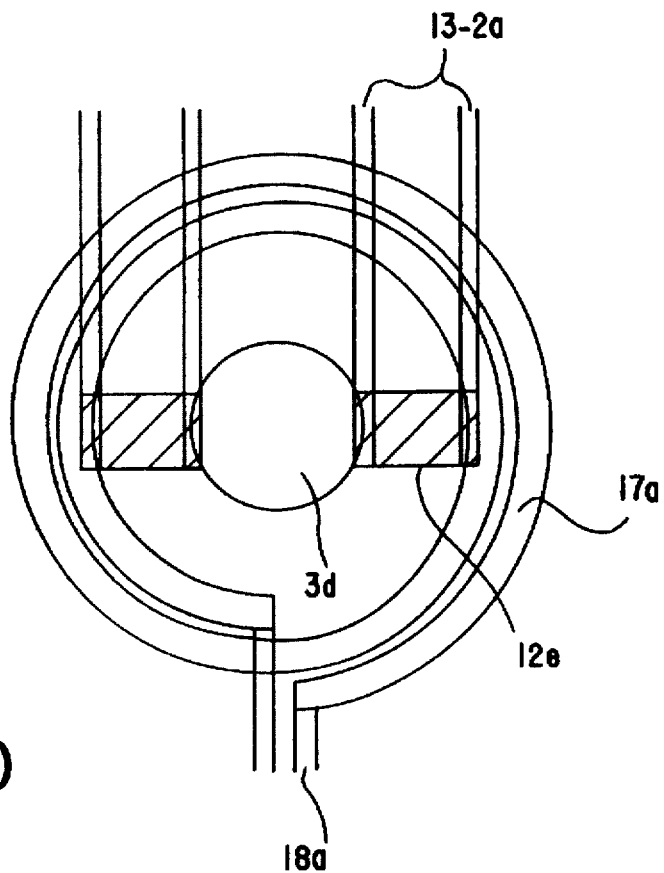

An eighth preferred embodiment of the present invention is hereinafter explained with reference to FIG. 10. In this preferred embodiment, return yoke 14b of FIG. 6 is formed with a double eddy 17a, to both the ends of which lead-out conductors 18a are connected, so as to perform two functions, that is, as an exciting coil and as a return yoke.

This return yoke 17a serving concurrently as an exciting coil is formed, for instance, of nickel-iron of 2 μm in thickness and 5 μm in width. In writing operation, lead-out conductors 18a are connected to power supply 7-2 so as to apply an exciting current of, for instance, 50 mA to return yoke/ exciting coil 17a. Two of MR elements 12e magnetically couple probe 3d with the inner ring of return yoke/exciting coil 17a. Lead-out conductors 13-2a & 18a and return yoke/exciting coil 17a, intersecting with each other as shown in plane view of FIG. 10, are electrically insulated from each other.

Figure 11A:
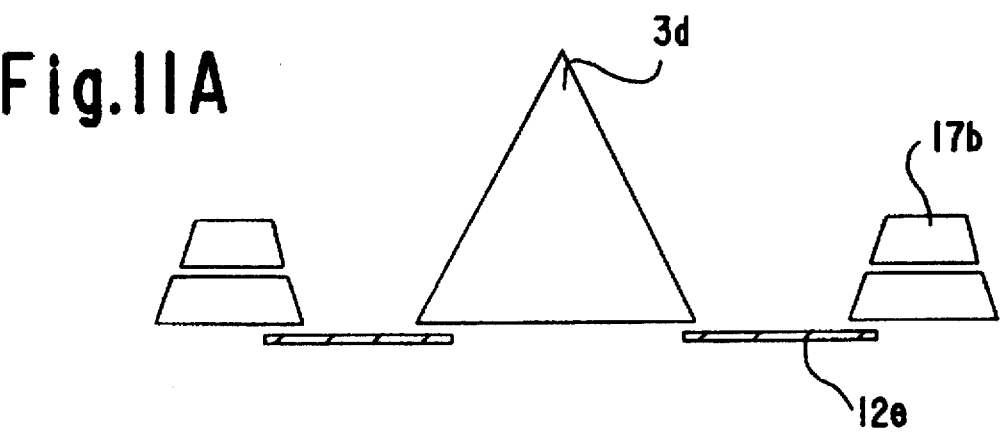
Figure 11B:
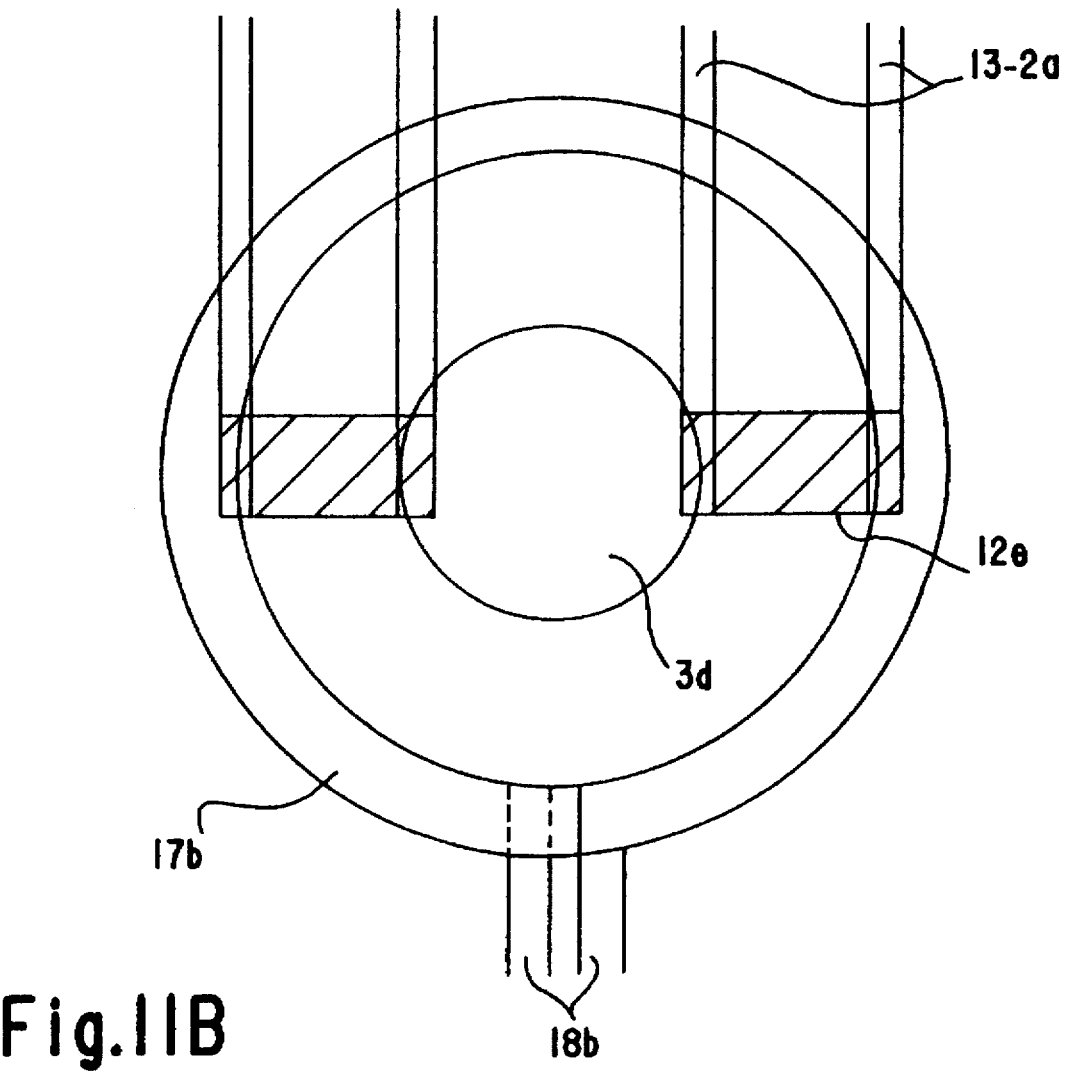

A ninth preferred embodiment of the present invention is hereinafter explained with reference to FIG. 11. In this preferred embodiment, the return yoke/exciting coil 17b is formed with a serially connected double stack of two of the return yoke of FIG. 6, where the ends of the serial connection are connected with lead-out conductors 18b so as to serve concurrently two functions as an exciting coil and a yoke. Each in the stack of return yoke/exciting coil 17b is formed of nickel-iron of 2 μm in thickness and 5 μm in width, for instance. Coils in the double stack are insulated from each other with an alumina film, which is not shown in the figure, in the way similar to insulation layer 11.

Illustration of the lead-out conductor of the probe has been omitted in FIGS. 6 to 12 similarly to FIG. 5. Intersections with the MR elements, etc. seen in the plan view are insulated with an insulation layer. In the configurations of the above-mentioned eighth and ninth preferred embodiments, the probe magnetization efficiency in the writing operation is excellent because the exciting coil is arranged close to the probe.

Figure 12:
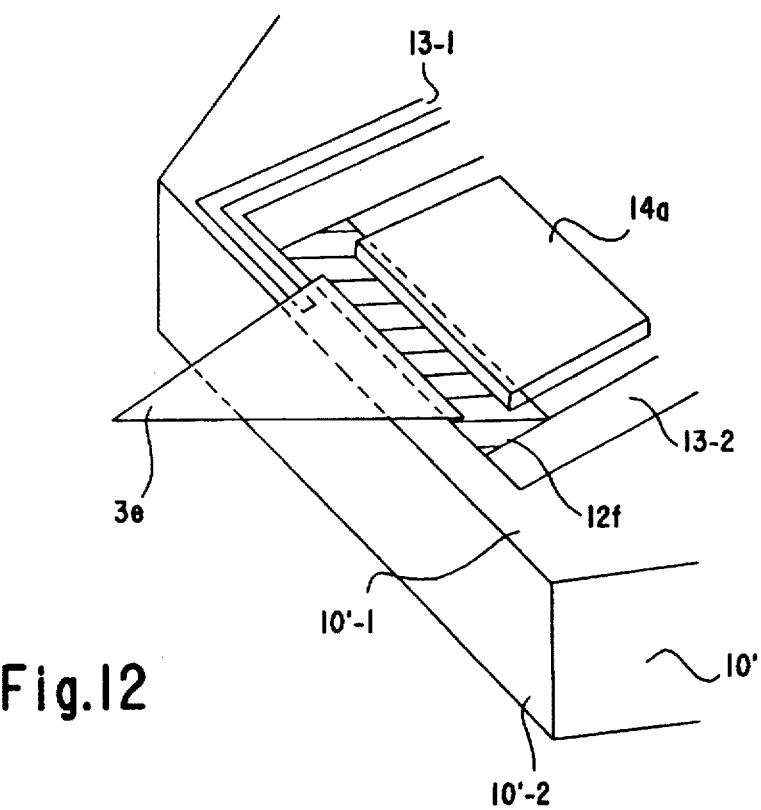

A tenth preferred embodiment of the present invention is hereinafter explained with reference to FIG. 12. In this preferred embodiment a triangular thin film 3e having a sharp angle at the top is employed in place of the cone 3a or pyramid 3b. Thin film probe 3e is formed with a triangular of nickel-iron alloy of about 1 μm in thickness 10–20 μm in width at the base and 10—20 μm in height, having about 20 degrees of the top angle. Only a base side of this thin film triangle is fixed so that the majority of the triangle projects into the air, i.e. midair. However, the size is so small that the probe can be held adequately reliably. Because this probe can be formed of a thin film upon a surface 10'-1 of supporting substrate 10', the composition or its magnetic characteristics, such as, the anisotropic characteristics, can be more easily accomplished, as well as the probe is more easily manufactured than the cone/pyramid type probe of the first to ninth preferred embodiments.

The probe of the tenth preferred embodiment can be manufactured by the following method. Patterns of MR element 12f and lead-out conductors 13-1 and 13-2 respectively thereof are formed on an insulation layer (not shown in FIG.12) on supporting substrate 10' of silicon of, for instance, 400 μm in thickness. Thereupon is formed a second alumina insulation film (not shown in the figure) upon an area except the ends of the probe lead-out conductor 13-1. Next are formed a probe 3e at a place where the probe base magnetically couples with MR element 12f and contacts lead-out conductor 13-1, and return yoke 14a, by plating or sputtering, etc. upon the second insulation layer. Next, the entire surface, except the probe is coated with a resist material. The exposed silicon of the substrate beneath the probe is removed by an etching process, so that the pointed end of probe 3e is left in the midair.

Figure 13:
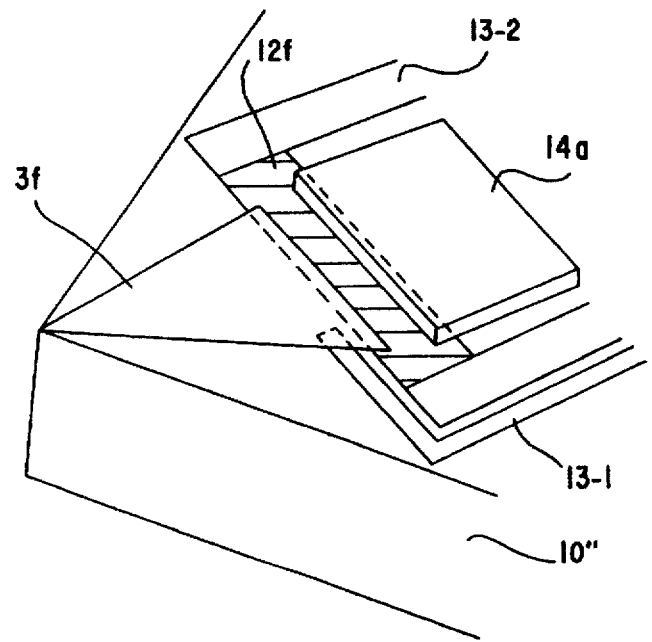
Figure 14A:
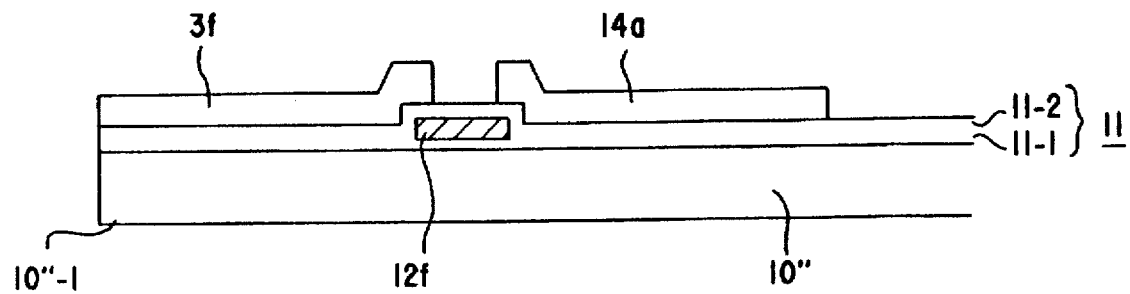
Figure 14B:
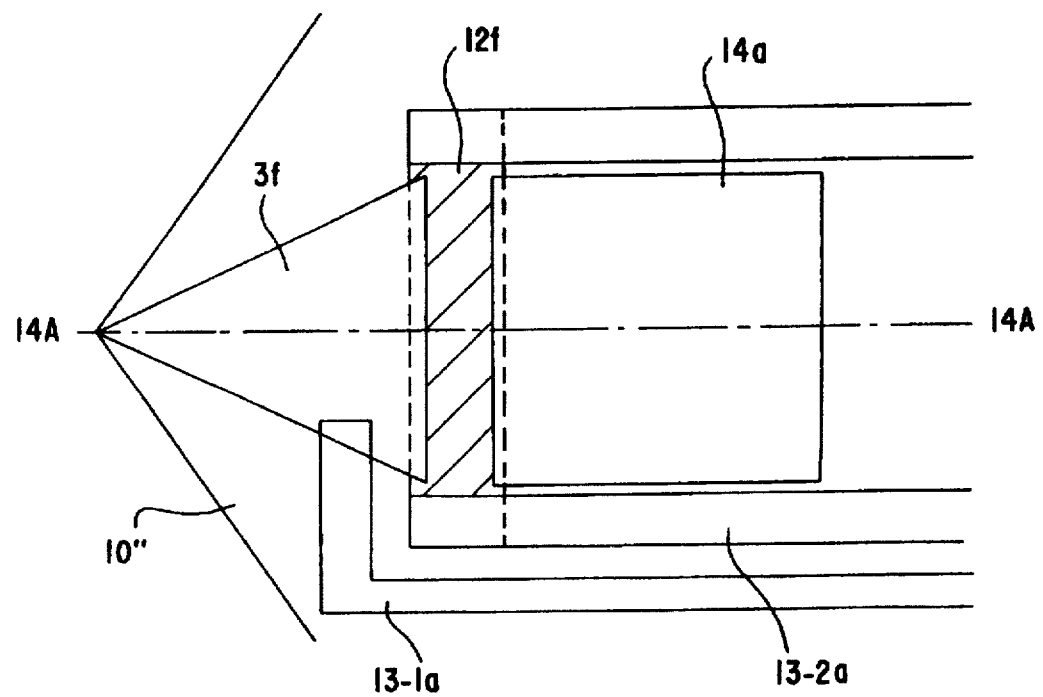

An eleventh preferred embodiment of the present invention is hereinafter explained with reference to FIG. 13 and FIG. 14. In this preferred embodiment, thin film 3f of probe 3e of the tenth preferred embodiment is entirely fixed on supporting substrate 10". After MR element 12f and its lead-out conductors 13-2a (not shown in FIG. 14A) are formed on alumina insulation layer 11-1 upon supporting substrate 10" of about 400 μm thick silicon by a deposition or plating, an insulation layer 11-2 (not shown in FIG. 13), for instance of alumina, is formed upon the entire surface. Moreover, thereupon are formed a triangular thin film probe 3f having a top angle of about 30 degrees and a return yoke 14a so as to magnetically couple respectively with both the longitudinal sides of MR element 12f, and lead-out conductor 13-1a of probe 3f is formed, by the use of photoresist. Finally, some part of the supporting substrate is removed by an etching or a machine processing so that the pointed end of supporting substrate 10" beneath the probe coincides with the pointed end of probe 3f. At that time, the pointed end of the supporting substrate must not extend beyond the pointed end of the probe. The pointed end angle seen in the horizontal plane of the supporting substrate be the same as or larger than the pointed end angle of the probe, accordingly typically 60–90 degrees. When looked at from the side of the supporting substrate, the angle of the substrate's pointed end in contact with the probe is about right-angled. Merit of this configuration is in that the probe is tough against an external shock as well as is easy to handle.

As a twelfth preferred embodiment of the present invention, hereinafter explained are locations of the probe and the supporting substrate of the eleventh preferred embodiment with respect to the magnetic recording medium, with reference to FIG. 15. In this preferred embodiment, a substrate surface 10"-1 carrying thin film probe 3f, MR element 12f and return yoke 14a faces the surface of magnetic recording medium 1 but is inclined by an angle about 45 degrees with respect to the magnetic recording medium surface. This arrangement allows the probe end to easily reach the magnetic recording medium without worrying about the other portion than the probe end to touch the magnetic recording medium.

As a thirteenth preferred embodiment of the present invention, hereinafter explained is an arrangement of the cone type probe and the supporting substrate with respect to the magnetic recording medium constituted in the first to ninth preferred embodiments, with reference to FIG. 16. In this preferred embodiment, a substrate surface 10-1 carrying cone type probe 3, MR element and return yoke faces to the surface of magnetic recording medium 1 but is inclined with respect to the magnetic recording medium surface. This arrangement allows the probe end to easily reach the magnetic recording medium without worrying about the other portion than the probe top, such as external conductor 22, to touch the magnetic recording medium.

Figure 17:
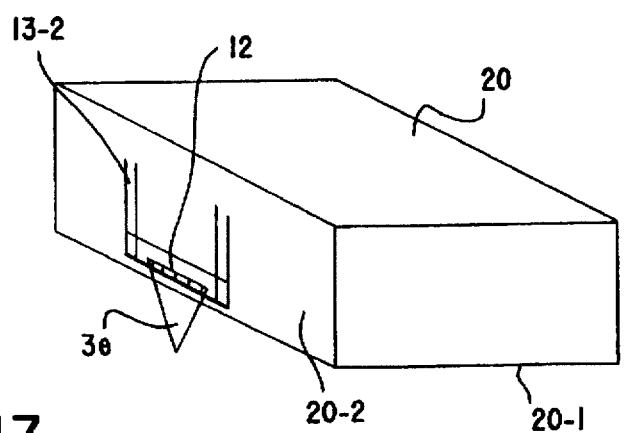

As a fourteenth preferred embodiment of the present invention, hereinafter explained is an arrangement of the midair type probe 3e and the supporting substrate with respect to the magnetic recording medium constituted in the tenth preferred embodiment, with reference to FIG. 17. In this configuration, a substrate surface 20-2 carrying midair-type probe 3e, MR element and return yoke thereon is orthogonal to another surface 20-1 which faces to the surface of magnetic recording medium 1. It is advantageous that no attention has to be paid for the lead-out conductors 13-2 and their external conductor (not shown in FIG. 17) to touch the magnetic recording medium.

Figure 18:
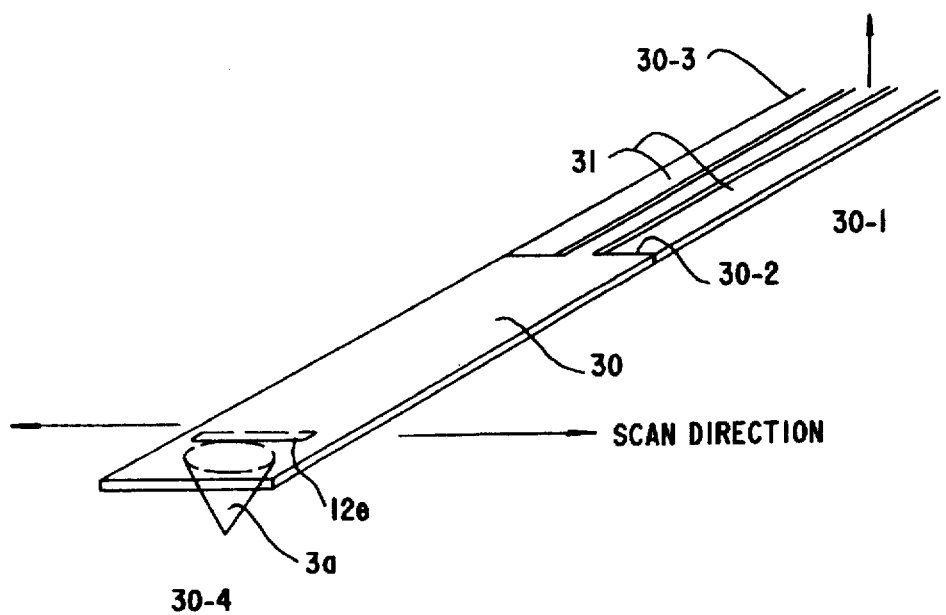

A fifteenth preferred embodiment of the present invention is hereinafter explained with reference to FIG. 18. A beam 30 for the scanning mechanism is formed with a silicon plate of, for instance, 20–50 μm in thickness and 200–400 μm in width and 10 mm in length in parallel to a magnetic recording medium. On a surface of the beam at its free end 30-4 there are formed a cone type probe 3a, an MR element 12e and lead-out conductors. In the vicinity of another end, i.e. a fixed end 30-3 of beam 30, only the core part 30-1 of beam 30 has an extension along the longitudinal direction of the beam. Two piezo elements 31 are provided coplanar with the extension 30-1 respectively on both the sides of extension 30-1. An end of piezo element 30-1 is mechanically connected with a shoulder 30-2 of beam 30 respectively. When a driving voltage is applied alternately to one of two piezo elements 31, thus voltage-applied one of piezo elements 31 pushes respective one of shoulders 30-2 of the beam. As a result, the free end 30-4 of the beam, i.e. the probe, moves in the direction shown with an arrow in FIG. 18 in parallel with the plate of beam 30 so as to scan magnetic recording medium 1. Piezo elements 31 are driven preferably with an AC voltage of a resonance frequency of the entire beam carrying the probe, for instance, 1 KHz in the scan direction. The configuration of FIG. 18 is advantageous in making a cone type probe.

A sixteenth preferred embodiment of the present invention is hereinafter explained with reference to FIG. 19. A beam 32 is formed with a silicon plate, for instance, of 20–50 μm in thickness, 200–400 μm in width and 10 mm in length, orthogonal to the magnetic recording medium. A thin film type probe 3e, an MR element 12f and the return yoke explained in the tenth preferred embodiment are installed on an open end of scan beam 32. Pointed end of probe 3e projects outwards from the beam. Two piezo elements 33 are glued respectively on both the sides of the beam at the vicinity of another end, i.e. a fixed end 32-3 of beam 32. Upon an application of a driving voltage alternately to one of the piezo element 33, the piezo element having the voltage applied thereto expands so as to expand the beam side to which the piezo element has been fixed. Consequently, beam elastically bends along the arrow shown in FIG. 19 while the open end 32-4 carrying the probe is rigid in the direction orthogonal to the magnetic recording medium 1.

Figure 19:
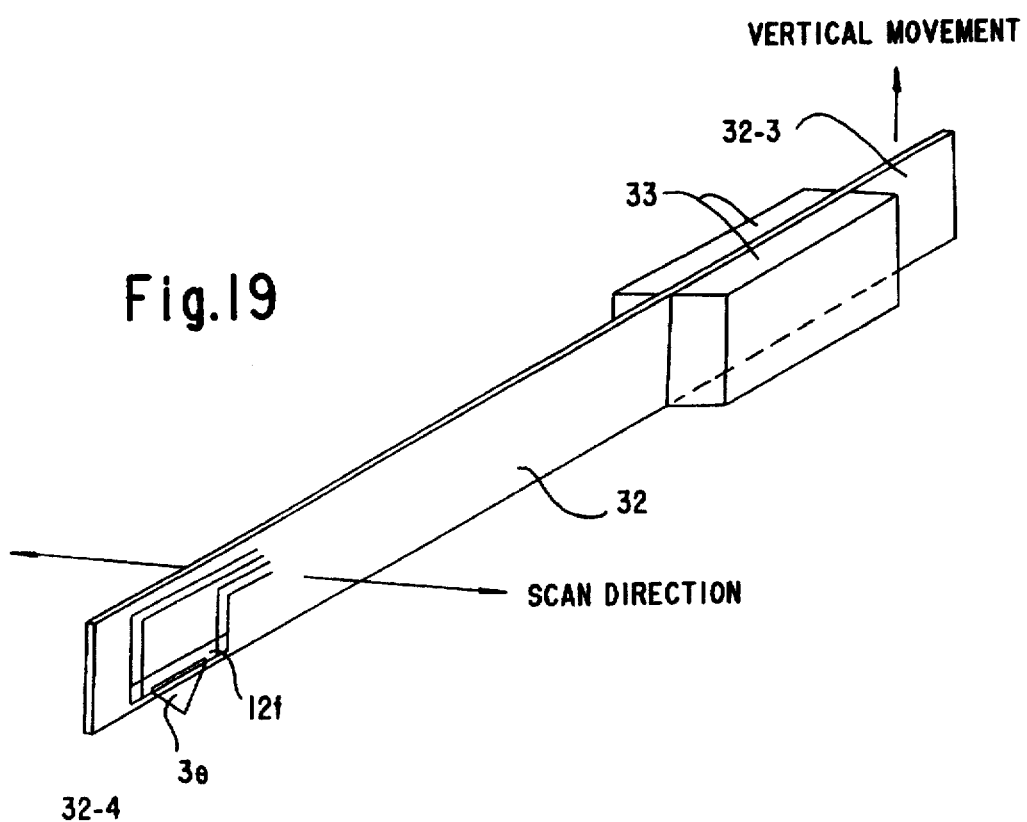

The configuration of FIG. 19 is advantageous in making a thin film type probe. The configuration of FIG. 19 is also advantageous in that the mechanical resonance frequency of the entire beam is low so as to allow a bis stroke of the scanning.

Beam 30 or 32 and their piezo element 31 or 33 described respectively in the fifteenth and sixteenth preferred embodiments constitute scan driving mechanism 6-2 of FIG. 1.

Fixed ends 30-3 and 32-3 of the scanning beams 30 and 32 are respectively fixed to gap driving mechanism 4-3 which moves along a direction Z vertical to the magnetic recording medium surface as shown in FIGS. 18 and 19. In this gap driving mechanism 4-3, there is preferably employed a stack of a plurality of piezoelectric elements each formed of a thin plate having electrodes upon its opposite surfaces, to which a driving voltage is applied so as to generate an expansion, the stroke.

Figure 20:
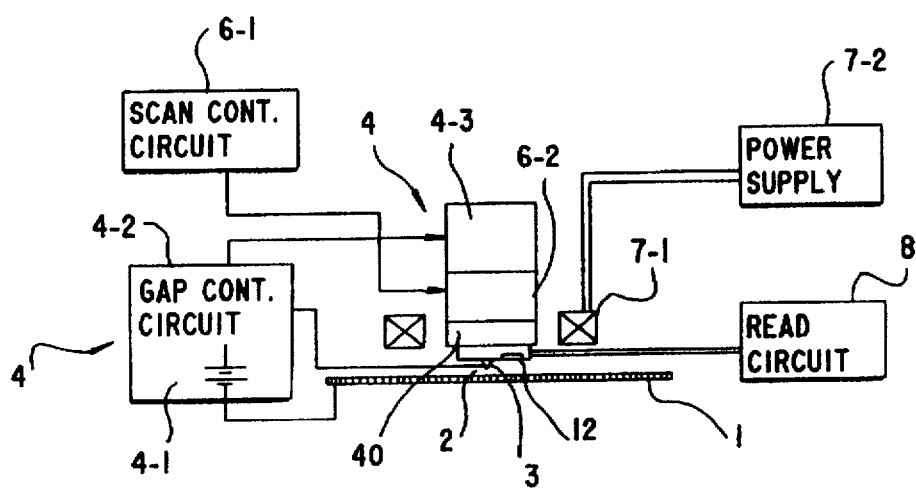

A seventeenth preferred embodiment of the present invention is hereinafter explained with reference to FIG. 20 to FIG. 24. This preferred embodiment is an application of thin film probe projecting into the air, i.e. projecting beyond end-side 10''-2 of supporting substrate 10'' of FIG. 12. The probe's pointed end is sheltered from the scanning position except during the scanning of the recording medium, in order to protect the probe's pointed end from contacting the recording medium surface caused from an accidental external shock. On the rear end of probe 3g is provided a probe-sheltering mechanism 40 for recessing the probe to behind an end-side 10'''-1 of supporting substrate 10''', as schematically shown in FIGS. 20 and 21.

Figure 21:
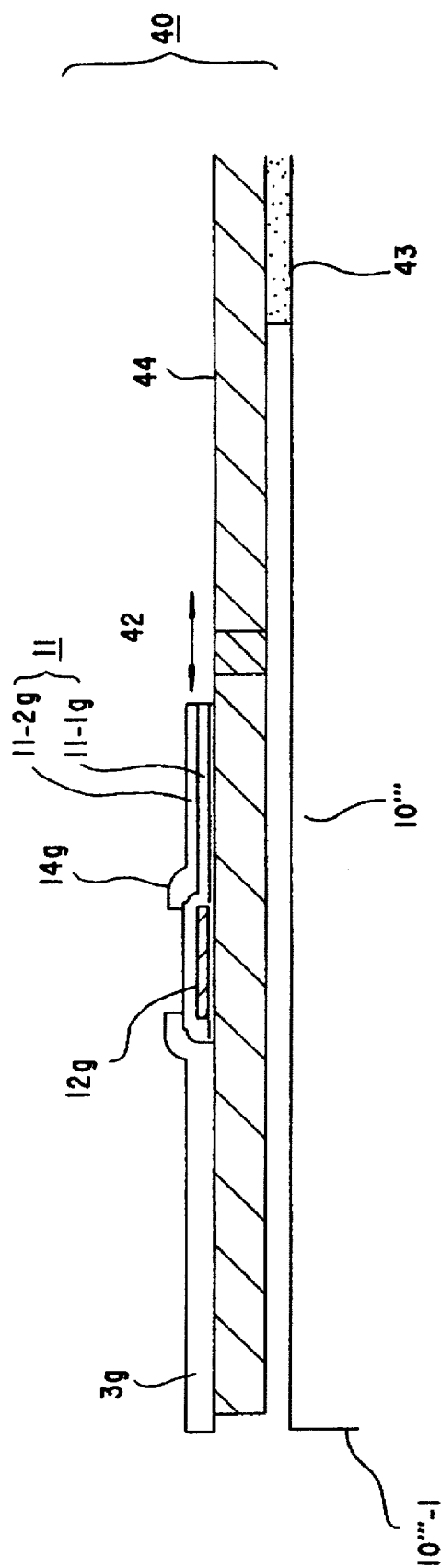
Figure 22:
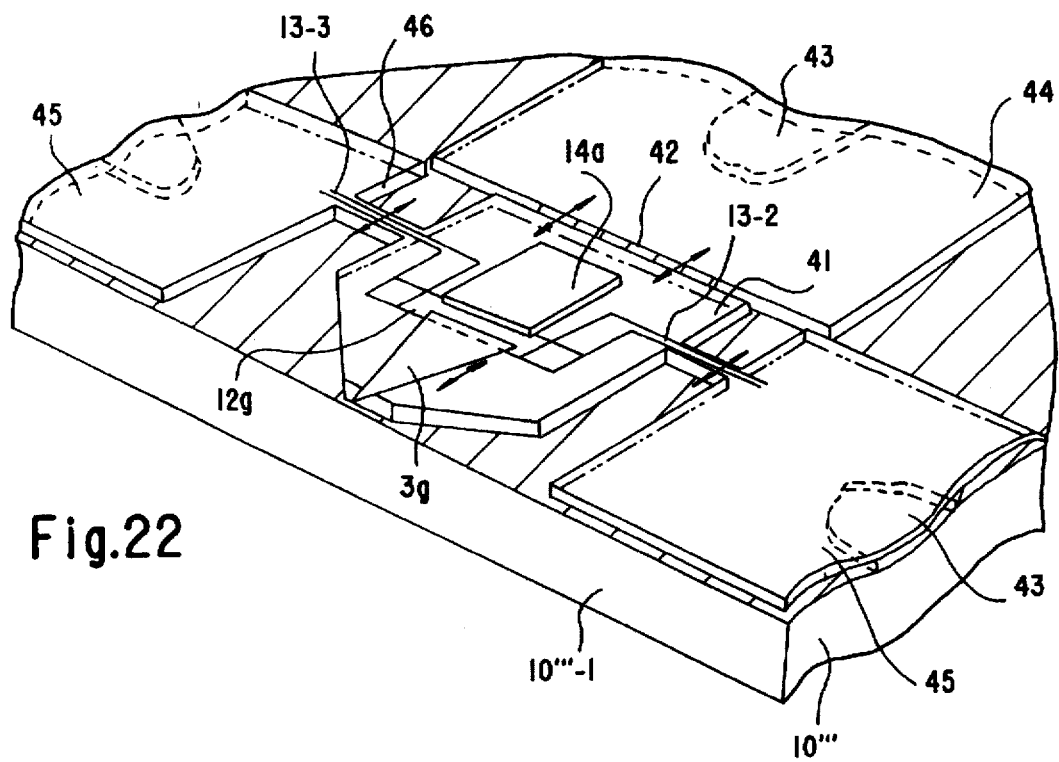

Configuration of probe sheltering mechanism 40 is schematically shown in FIGS. 21 and 22. The configuration is hereinafter explained by describing the manufacturing procedure of probe sheltering mechanism 40.

(1) Upon supporting substrate 10''' typically formed of silicon, both the surfaces of which are protected with a silicon dioxide (SiO$_2$) film (not shown in FIGS. 21 and 22) typically by a thermal oxidization, there is formed an insulating layer (43 and 43'), typically of alumina (Al$_2$O$_3$), of 2 μm in thickness, as a sacrificial layer.

(2) Thereupon is formed a 3 μm thick poly-silicon layer (41, 44, etc.).

(3) Upon an insulation layer, for instance, of alumina, on the poly-silicon layer are formed MR element 12g and its lead-out conductor 13-2 by the use of patterning and etching techniques.

(4) A second insulating layer 11-2g which does not solve to an alkaline solution, typically SiO$_2$, is formed upon the area to become moving substrate 41 except the area where MR element 12g and its lead-out conductor 13-2 and probe 3g are to be fabricated, Insulating films 11-1g and 11-2g are not illustrated in FIG. 22.

(5) Probe 12g is formed on movable substrate 41 so that a side of the probe magnetically couples with a side of MR element 12g.

(6) Upon insulation layer 11g is formed a return yoke 14g so as to magnetically couple with another side of the MR element.

(7) The poly-silicon layer formed according to the above steps (1) and (2) is coated with a resist pattern on an area to become comb teeth 42a of the electrostatic actuator, driving layer 44 and movable substrate 41 and their connection part, supporting layer 45, support sticks 46 to connect movable substrate 41 with support layer 45 and probe 3g, and then etched, so as to fabricate the movable part and the comb teeth structure.

(8) Alumina sacrificial layer 43' located underneath movable substrate 41 is removed with an isotropic etching by the use of an alkali solution, typically sodium hydroxide (NaOH), etc. During this etching operation to remove all the alumina underneath movable substrate 41, the etchant invades also the underneath of the area to become driving layer 44, resulting in some etching of thus invaded area. However, sacrificial layer 43 remains enough to hold driving layer 44 and support layers 45.

(9) The edge of supporting substrate 10''' is cut with a diamond cutter so that the pointed end of probe 3g projects by a predetermined distance, for instance, 5 μm beyond the edge 10'''-1 of supporting substrate 10'''. In the case where the supporting substrate is a silicon wafer, instead of the cutting process the removal processing can be easily done by an anisotropic etching along the crystal of the wafer with potassium hydroxide (KOH) after the silicon oxide protection film is removed. In FIG. 22 the hatched area shows surfaces where the sacrificial layer 43' has been removed.

Figure 23:
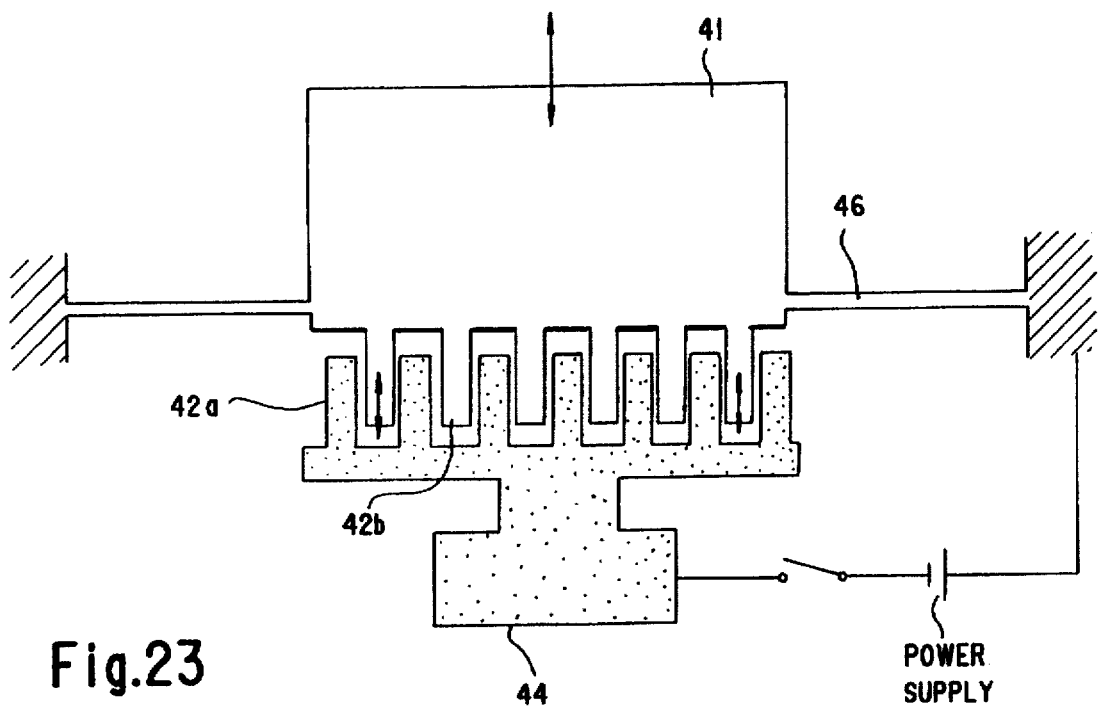

A principle configuration of a comb-drive actuator is shown in FIG. 23 in a plane view, where the structure of comb teeth is particularly expanded. Plural number of comb teeth 42a of driving layer 44 fixed to the supporting substrate and plural number of comb teeth 42b of movable substrate 41 mutually enter the comb teeth spaces of the opposite sides. Each of the sides and the ends of the comb teeth is separated by spaces from each of the opposite ones. Movable substrate 41 is supported flexibly along the direction of the stroke shown with the arrows in the figure, with two support sticks 46 extending in the direction orthogonal to the stroke of movable substrate 41.

On an application of a predetermined DC voltage across the opposite sets of comb teeth, electrostatic charges are generated on the sides of the mutually facing comb teeth, whereby an electrostatic force of the charge is generated in a direction to increase the area of the facing sides. As a result, there is generated a component of the electrostatic force to mutually attract the opposite sets of the comb teeth.

Figure 24A:
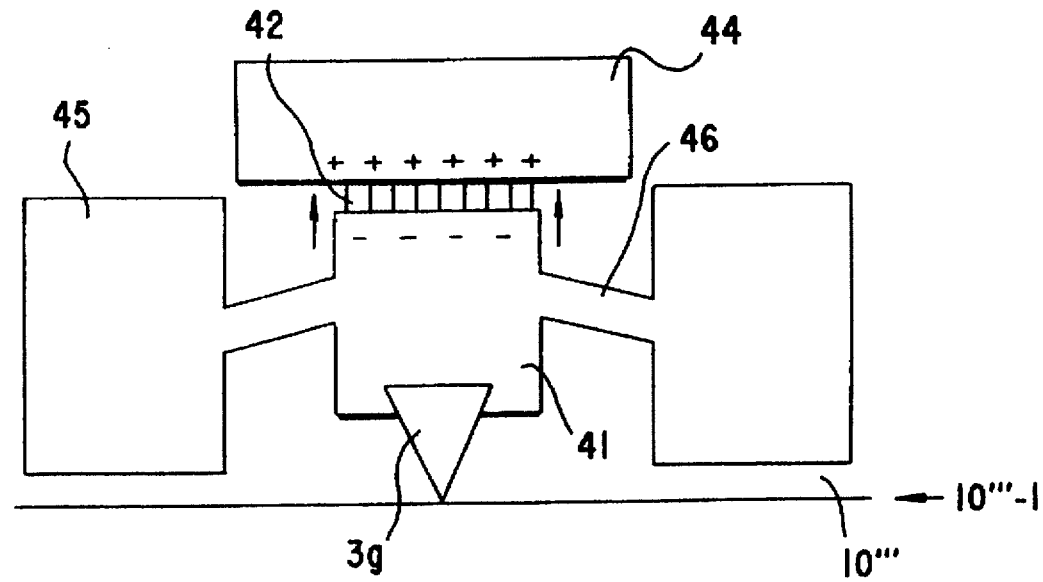
Figure 24B:
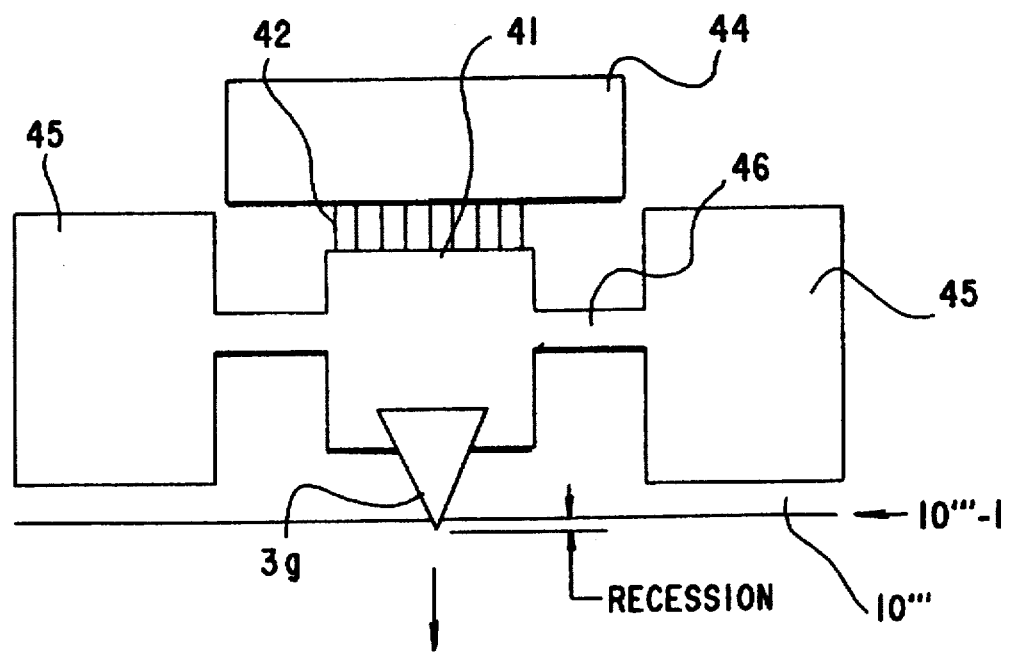

In FIGS. 24A and 24B are schematically illustrated the positions of movable substrate 41 carrying probe 3g with respect to supporting substrate 10''', as well as the bend of support sticks 46 for two cases where the voltage is applied and not applied across the mutually opposite sets of comb teeth, respectively. That is, for probe 3g not to perform the recording/reproducing operation, the voltage is applied to electrostatic comb-drive actuator 42 so that the probe end retreats to inside the end face 10'''-1 of supporting substrate 10''' by the mutually attracting force. For probe 3g to operate, the voltage applied to electrostatic comb-drive actuator 42 is removed to release the bend of support sticks 46 so as to allow the probe end to project outside beyond end face 10'''-1 of the supporting substrate.

The electrostatic comb-drive actuator has been disclosed typically in "An Integral Tunneling Unit", IEEE, Micro Electric Mechanical Systems '92 p. 214-218, and "POLY-SILICON MICROSTRUCTURES TO CHARACTERIZE STATIC FRICTION", Proceedings of IEEE Micro Electro Mechanical Systems , February 1990, p.82-88 by Kobayashi etc.

The tunnel current detected by probe 3g is led out outside by way of the movable substrate 41, the support stick 46 and the support layer 45. Illustration of the lead-out conductor from the support layer and driving layer to the outside is omitted.

Mutual relation of the stacking order of the probe, the return yoke, the MR element, insulation layer 11g therebetween and the lead-out conductor in the seventeenth preferred embodiment may be of those of the structure of the preferred embodiments up to the sixteenth.

Figure 25:
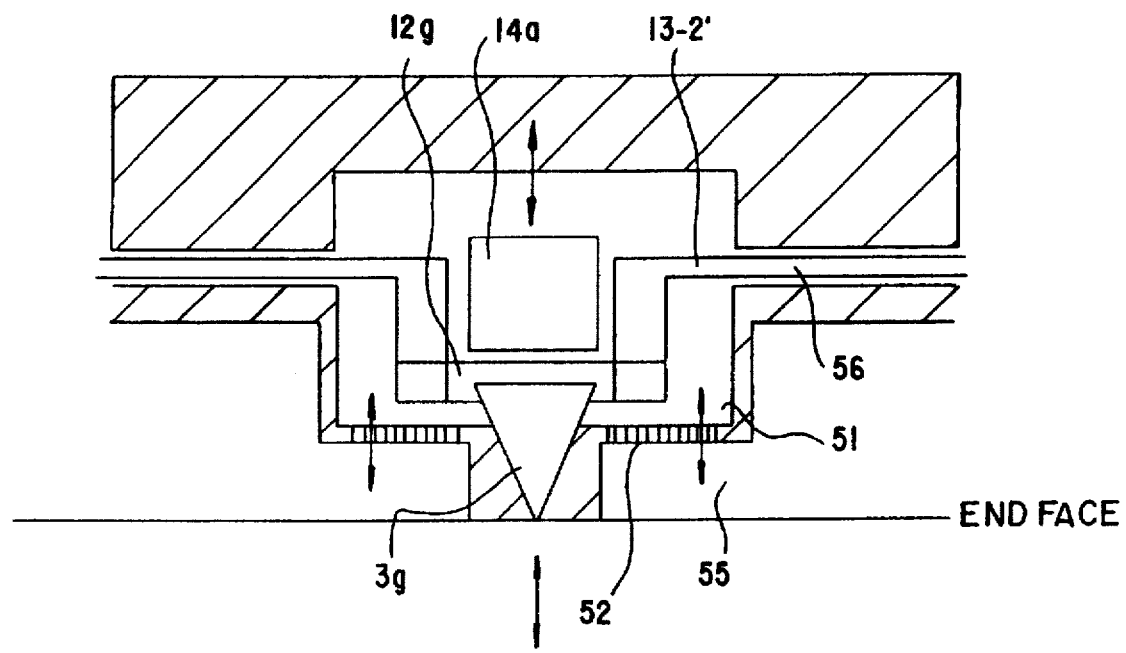
Figure 26A:
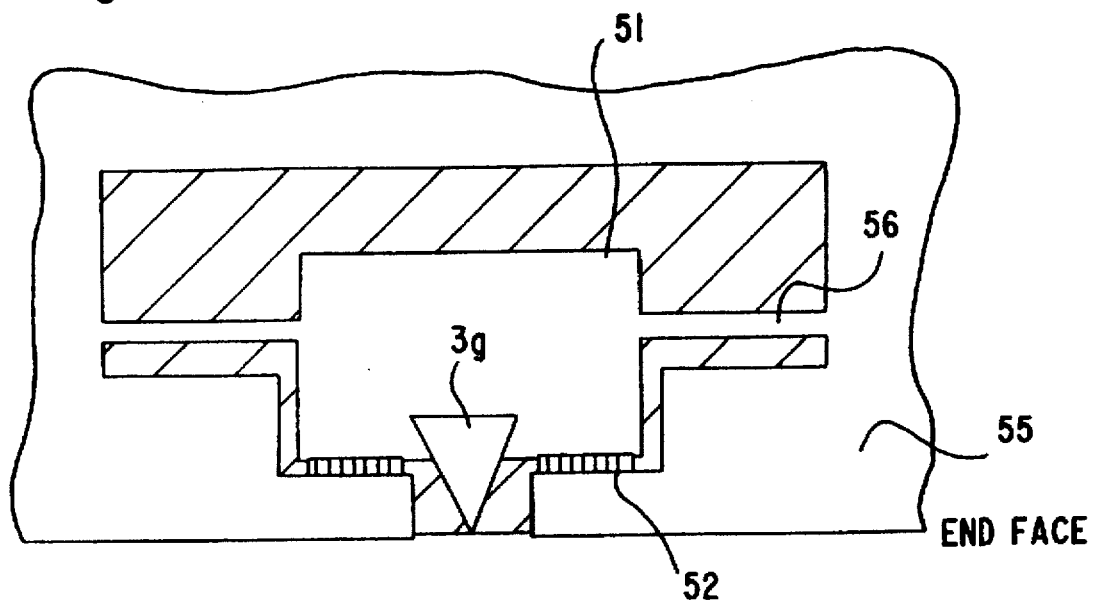
Figure 26B:
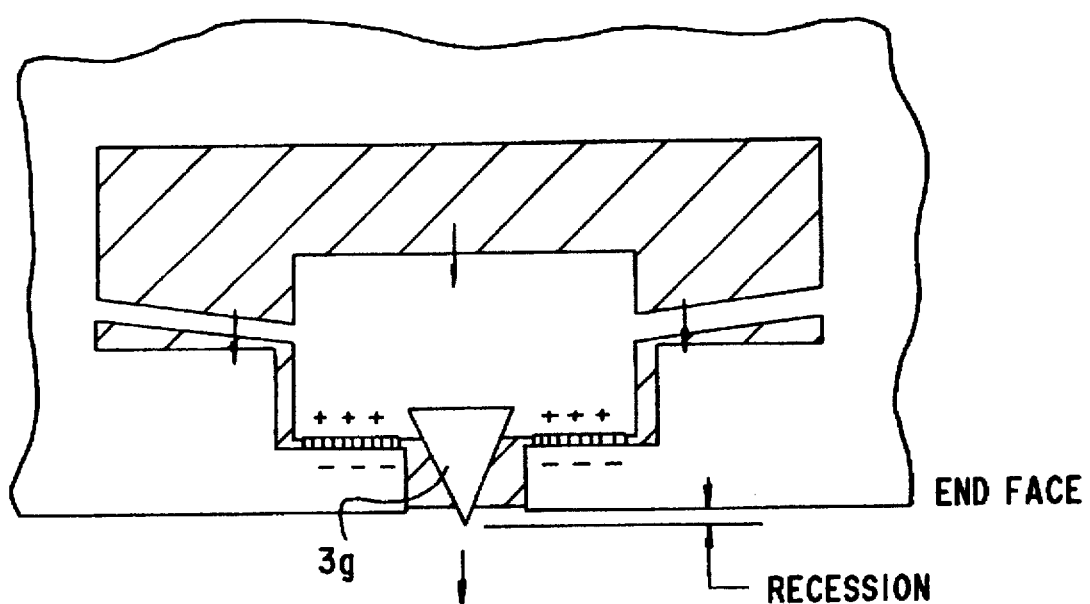

An eighteenth preferred embodiment of the present invention is hereinafter explained with reference to FIG. 25 and FIG. 26. The procedure of manufacturing this preferred embodiment is essentially the same as the seventeenth preferred embodiment; accordingly, the detailed explanation of the structure is omitted. In FIG. 25, too, the hatched area illustrates the surface after the sacrificial layer thereon has been removed. Two of driving layers 55 are provided on both the sides of the probe. Therefore, electrostatic comb-drive actuator 52 between movable substrate 51 and driving layers 55 are arranged divided to both the sides of the probe, as well. When the probe is to be operated, electrostatic comb-drive actuator 52 pushes the probe outwards beyond supporting substrate end face 10'''-2 by reducing the gap by an application of the driving voltage.

The eighteenth preferred embodiment is different from the seventeenth preferred embodiment and is advantageous thereover in that the constitution of the electronic circuit becomes simple because the driving voltage is applied to the electrostatic comb-drive actuator only when the probe is in operation.

In the above preferred embodiments, silicon was referred to as an example of the supporting substrate. This was because the etching of silicon is easily carried out. However, it is needless to say that other non-magnetic insulators, for instance, glass, silica, alumina or resin may be employed in place of silicon.

In the above preferred embodiments, an MR element was referred to as an example of the flux detecting element. However, it is needless to that other magneto-electric converting element, such as Hall effect elements, etc. may be employed in place of the MR element.

In the above preferred embodiments, nickel-iron was referred to as a typical material for the probe. However, it is needless to say that other kind of soft magnetic materials, such as nitride iron (FeN), etc. may be employed in place of nickel-iron.

Though in the seventeenth and eighteenth preferred embodiments a probe of a thin film was typically referred to, it is needless to say that other type of probe, such as cone type probe of the first preferred embodiment, may be employed in the probe sheltering mechanism, as well.

The insulation film and its etching solution referred to in the description of the seventeenth preferred embodiment are only for example. It is needless to say that any combination of other insulation film material and its etching solutions may be employed thereto as long as their functions are achieved.

Thus, according to the present invention, a magnetic memory device of an extremely small structure which allows the super-high density writing and reading capability is accomplished while generating no noise which was caused from the scan in contact with the recording medium surface.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications are equivalents may be resorted to, falling within the scope of the invention.

What is claimed:

1. A magnetic memory device comprising:
   a magnetically recording medium (1);
   a probe (3) formed at least partly of an electrically conductive as well as soft-magnetic material, a pointed end of said probe facing said magnetically recording medium across a first gap (2);
   a magnetic flux detecting element (12) for detecting a magnetic flux caught by said probe, said magnetic flux corresponding to a data recorded on said magnetically recording medium;
   a vertical controller means (4) for keeping said first gap constant by the use of a tunnel current flowing via said gap into said probe while a voltage being applied across said gap; and
   a scan mechanism (6) for scanning said probe along said magnetically recording medium.

2. A magnetic memory device as recited in claim 1 further comprising:
   an exciting coil (7-1, 17a, 17b) for magnetizing said probe so as to write a data in said magnetically recording medium.

3. A magnetic memory device as recited in claim 1, wherein said magnetic flux detecting element is formed of a magneto-resistive element.

4. A magnetic memory device as recited in claim 1, wherein said magnetic flux detecting element is formed of a Hall-effect element.

5. A magnetic memory device as recited in claim 1, wherein said magnetically recording medium is vertically magnetic.

6. A magnetic memory device as recited in claim 1, wherein a top of said probe is in a shape of a cone, a needle or a pyramid, wherein at least a surface of said probe is formed of a soft magnetic material.

7. A magnetic memory device as recited in claim 6, wherein said probe is arranged substantially orthogonal to a surface (10, 10-1, 30) on which said magnetic flux detecting element is formed.

8. A magnetic memory device as recited in claim 1, wherein said probe is formed of a thin film (30, 3f) having a sharp pointed end.

9. A magnetic memory device as recited in claim 8, wherein a base of said probe is fixed on a supporting substrate (10', 32), said pointed end is in midair, said base being opposite from said pointed end on said probe.

10. A magnetic memory device as recited in claim 8, wherein said probe is entirely fixed on a non-magnetic supporting substrate (10"), and said pointed end of said probe is on an edge (10"-1) of said supporting substrate.

11. A magnetic memory device as recited in claim 1, wherein an end of said magnetic flux detecting element (12a) is magnetically coupled with a base (30-1, 3b-1) of said probe or a supplemental yoke (15) which is magnetically coupled with said base of said probe, another end of said magnetic flux detecting element is magnetically coupled with a side of a return yoke (14), said return yoke is magnetically coupled with said magnetically recording medium via a second gap (2') between said second yoke and said magnetically recording medium.

12. A magnetic memory device as recited in claim 1, wherein a base (3b-1) of said probe (3b) or a base of a supplemental yoke (15) magnetically coupled with said base of said probe comprises a straight side (3b-1, 15-1), said magnetic flux detecting element (12a, 12f) being arranged in parallel with said straight side.

13. A magnetic memory device as recited in claim 7, wherein said magnetic flux detecting element (12a) is arranged radially from a base of said probe (3d).

14. A magnetic memory device as recited in claim 7, wherein a base (3e-1) of said probe (3e, 3f) is substantially circular, said magnetic flux detecting element (12b) is in a shape of an arc so as to be arranged along said circular base (3e-1).

15. A magnetic memory device as recited in claim 7, wherein a base (3f-1) of said probe (3f) is subsequently circular, said magnetic flux detecting element is arranged coaxially around said substantially circular base, wherein said magnetic flux detecting element is cut along a radial opening (12d-1), two ends of said magnetic flux detecting element, at said opening, are terminals for leading out a current in said magnetic flux detecting element.

16. A magnetic memory device as recited in claim 14, wherein a plurality of non-magnetic conductors (16) are arranged in contact with an upper or a lower surface of said magnetic flux detecting element (12d), said conductors being slanted with respect to a tangent of said arc of said magnetic flux detecting element.

17. A magnetic memory device as recited in claim 11, wherein said return yoke (14b, 17a, 17b) is arranged substantially coaxial around said probe (3d), wherein at least at a single portion of an inner edge of said second yoke is magnetically coupled with said magnetic flux detecting element (12b, 12e).

18. A magnetic memory device as recited in claim 15, wherein said magnetic flux detecting element (12d) is utilized as an exciting coil for magnetizing said probe to record a data by applying a current thereto.

19. A magnetic memory device as recited in claim 17, wherein said return yoke (17a, 17b) is utilized as an exciting coil for magnetizing said probe to record a data by applying a current thereto.

20. A magnetic memory device as recited in claim 19, wherein said return yoke is formed in a shape of a spiral (17a) substantially coaxially arranged around said probe (3d).

21. A magnetic memory device as recited in claim 19, wherein said return yoke is formed of a stack of a plurality of ring (17b) substantially coaxially arranged around said probe (3d).

22. A magnetic memory device as recited in claim 7, wherein a first surface (10-1) of said supporting substrate comprises thereon at least said probe (3), said magnetic flux detecting element (12) and a lead-out conductor (13), said first surface (10-1) facing to said magnetically recording medium (1) and being slanted with respect to a surface of said magnetically recording medium so that an external conductor (22) to the outside is located farther from said magnetically recording medium than said probe.

23. A magnetic memory device as recited in claim 7, wherein a second surface (20-2) of said supporting substrate comprises at least said probe (3e), said magnetic flux detecting element (12) and a lead-out conductor (13-2), said second surface being substantially orthogonal to a first surface of said supporting substrate facing said magnetically recording medium.

24. A magnetic memory device as recited in claim 1, further comprising:
 a beam (30) attached to said probe for scanning along said magnetically recording medium, a surface (13-5) of said beam being in parallel with said magnetically recording medium, said surface of said beam carrying at least said probe (3), said magnetic flux detecting element (12e) and said lead-out conductor.

25. A magnetic memory device as recited in claim 1, further comprising:
 a beam (32) having a surface (32-1) orthogonal to said magnetically recording medium, attached to scanning said probe for scanning along magnetically recording medium; at least said probe (3e), said magnetic flux detecting element (12f) and said lead-out conductor being formed upon said surface (32-1) of said beam.

26. A magnetic memory device as recited in claim 1, further comprising:
 a probe sheltering mechanism (40) for retreating a pointed end of said probe (3g) to behind an end face (10'"-1, 10'"-2) of a supporting substrate (10'") when said probe being out of operation, said probe being supported on said supporting substrate, said probe sheltering mechanism being installed on a movable part of said vertical controller (4).

27. A magnetic memory device as recited in claim 26, further comprising:
 wherein said probe (3g) is movably installed on said supporting substrate, and said probe sheltering mechanism (40) comprises:
 a movable substrate (41) for supporting a rear end of said probe as well as moving upon said supporting substrate (10'"); and an actuator (42) for actuating said movable substrate.

28. A magnetic memory device as recited in claim 27, wherein said probe (3g) and said movable substrate (41) are formed upon a surface in parallel with a surface of said supporting substrate (10'").

29. A magnetic memory device as recited in claim 28, wherein said probe (3g) is formed substantially orthogonal to an end face (10'"-1) of said supporting substrate (10'").

30. A magnetic memory device as recited in claim 28, wherein said actuator (42) is formed of an electrostatic actuator.

31. A magnetic memory device as recited in claim 30, wherein said movable substrate (41) and a driving layer (44) which faces via said electrostatic actuator (42) to said movable substrate are formed of silicon, wherein said actuator (42) comprises an electrostatic actuator (42), mutually facing parts of which are in a shape of comb teeth.

32. A magnetic memory device as recited in claim 31, wherein said movable substrate (41) carries thereon a return yoke (41a), said magnetic flux detecting element (12g) and a lead-out conductor (13-3); and said movable substrate is supported via elastic beams (46) by said supporting substrate (10'").

33. A magnetic memory device as recited in claim 15, wherein a plurality of non-magnetic conductors (16) are arranged in contact with an upper of lower surface of said magnetic flux detecting element (12d), said conductors being slanted with respect to a tangent of a ring shape of said magnetic flux detecting element.

\* \* \* \* \*